(12) United States Patent
Nikkanen et al.

(10) Patent No.: US 10,916,036 B2
(45) Date of Patent: Feb. 9, 2021

(54) METHOD AND SYSTEM OF GENERATING MULTI-EXPOSURE CAMERA STATISTICS FOR IMAGE PROCESSING

(71) Applicant: Intel Corporation, Santa Clara, CA (US)

(72) Inventors: Jarno Nikkanen, Kangasala (FI); Rastislav Lukac, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 16/235,970

(22) Filed: Dec. 28, 2018

(65) Prior Publication Data

US 2019/0156516 A1    May 23, 2019

(51) Int. Cl.
| | |
|---|---|
| *G06T 7/80* | (2017.01) |
| *H04N 5/355* | (2011.01) |
| *H04N 5/235* | (2006.01) |
| *H04N 9/04* | (2006.01) |
| *G06T 5/50* | (2006.01) |
| *G06T 7/70* | (2017.01) |
| *G06T 7/90* | (2017.01) |
| *G06T 5/00* | (2006.01) |

(52) U.S. Cl.
CPC ............. *G06T 7/80* (2017.01); *G06T 5/009* (2013.01); *G06T 5/50* (2013.01); *G06T 7/70* (2017.01); *G06T 7/90* (2017.01); *H04N 5/2353* (2013.01); *H04N 5/2355* (2013.01); *H04N 5/35581* (2013.01); *H04N 9/045* (2013.01); *G06T 2207/20208* (2013.01); *G06T 2207/20221* (2013.01)

(58) Field of Classification Search
CPC .................. H04N 5/2355; H04N 5/35581
See application file for complete search history.

(56) References Cited

U.S. PATENT DOCUMENTS

2013/0004074 A1\* 1/2013 Gish .................... H04N 5/2355
382/173
2015/0348242 A1\* 12/2015 Molgaard .............. G06T 5/002
348/241

OTHER PUBLICATIONS

Nayer, S.K. et al., "High dynamic range imaging: spatially varying pixel exposures", IEEE Conference on Computer Vision and Pattern Recognition, CVPR 2000, Jun. 2000, 8 pages.

\* cited by examiner

*Primary Examiner* — Christopher K Peterson
(74) *Attorney, Agent, or Firm* — Green, Howard & Mughal LLP.

(57) ABSTRACT

A method, system, and article is directed to generating multi-exposure camera statistics for image processing by rearranging and sampling image data of multiple exposure images.

23 Claims, 10 Drawing Sheets

FIG. 8

| 0 (00) | 1 (01) | 2 (02) | 3 (03) |
| --- | --- | --- | --- |
| 4 (10) | 5 (11) | 6 (12) | 7 (13) |
| 8 (20) | 9 (21) | 10 (22) | 11 (23) |
| 12 (30) | 13 (31) | 14 (32) | 15 (33) |

FIG. 9A

| 0 | 1 | 32 | 33 |
| --- | --- | --- | --- |
| 4 | 16 | 36 | 17 |
| 8 | 9 | 40 | 41 |
| 12 | 24 | 44 | 25 |

FIG. 9B

Columns

|  | 00 | 01 | 10 | 11 |
| --- | --- | --- | --- | --- |
| 00 |  |  |  |  |
| 01 |  |  |  |  |
| 10 |  |  |  |  |
| 11 |  |  |  |  |

Rows

METHOD AND SYSTEM OF GENERATING MULTI-EXPOSURE CAMERA STATISTICS FOR IMAGE PROCESSING

BACKGROUND

Digital image capture and processing systems, whether on multi-function devices such as smartphones or on dedicated digital cameras, use automatic features or algorithms to improve the quality of an image such as for rendering or transmission of the images or to adjust camera settings to capture images. Features used to adjust camera parameter settings include 3A features for automatic focus (AF) and automatic exposure control (AEC). Features used to modify image data during refinement of the captured images include the 3A features or algorithms for automatic white balance (AWB) and other non-3A features that use statistics of a frame such as Local Tone Mapping (LTM) and Global Tone Mapping (GTM) for dynamic range conversion.

Difficulties arise when a camera uses multi-exposure techniques while providing statistics for the 3A algorithms. Specifically, in order to reduce the amount of 3A compute to a feasible level, 3A algorithms usually operate on certain statistics-like low-resolution data, referred to as 3A statistics, calculated from raw image data by image signal processor (ISP) hardware (HW) instead of operating directly on full-resolution images. Multi-exposure systems typically capture the same image multiple times in a burst of exposures, each with a different exposure level. For high dynamic range (HDR) images, the multiple exposures then are merged to form a high quality image by combining the best image data (or most suitable exposure level per region according to some criteria) from each capture. Often no way exists to extract the original separate exposure image captures from the merged HDR image to use them to compute statistics. The merged image, however, is not suitable to form the 3A statistics either directly or by reverting the merged image back to separate exposure image captures in order to obtain accurate exposure settings, because too much original information is lost by forming the merged image. Doing so can result in inaccurate exposure, color errors, and/or high power consumption, for example. Also, attempting to obtain 3A statistics from the separate original multiple exposure image captures is often costly when multiple different HDR techniques are used since each of these techniques usually requires different 3A statistics, and in turn, different hardware or firmware to generate those 3A statistics, which also increase in cost with the number of exposures used with each such technique.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8 is an illustration of an example block of pixel locations with notation used to form a descriptor code according to at least one of the implementations herein;

FIG. 9A is an illustration of an example descriptor code order in the form of a block of pixel locations with descriptor codes for each pixel location according to at least one of the implementations herein;

FIG. 9B is an illustration of an example input block of an image capture with binary notation according to at least one of the implementations herein;

DETAILED DESCRIPTION

Figure 1:
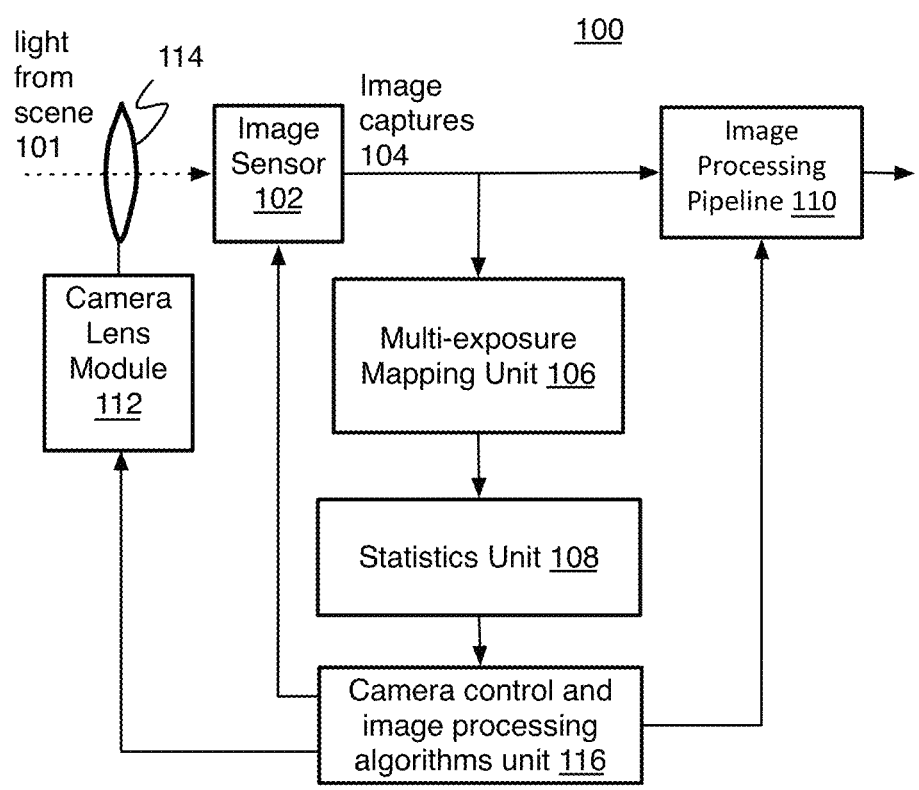
FIG. 1 is a schematic diagram of an image capturing and processing device in accordance with at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless specifically described and limited herein. For instance, various architectures employing, for example, multiple integrated circuit (IC) chips and/or packages, image signal processors (ISPs), digital signal processors (DSPs), graphics processing units (GPUs), and/or various computing devices and/or consumer electronic (CE) devices such as digital cameras, dedicated cameras, multi-purpose computing devices with one or more cameras, set top boxes, smartphones, laptop computers, tablets, televisions, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of generating multi-exposure camera statistics for image processing.

As mentioned above, many digital cameras and multipurpose devices provide automatic control features such as the 3A features including automatic focus (AF) to set the lens position on a camera, automatic exposure control (AEC) to set the exposure duration and other exposure parameters (e.g., analog and digital gains, aperture) on the camera, and automatic white balance (AWB) to refine the color shown on a resulting image. Also as mentioned, each of these algorithms use statistics in order to generate new parameters or settings to perform these functions. The 3A statistics also may be used by other camera control algorithms such as for lens shading correction (LSC) calculations, color conversions, and others. This also may include local tone mapping (LTM) or global tone mapping (GTM) that may use non-3A statistics which also are used to calculate image processing adjustments.

Multi-exposure camera systems, in addition to single exposure cameras, also use these statistics to modify camera capture parameters and refine image data. Since multi-exposure imaging is important in automotive, video surveillance (digital security), mobile, and videoconferencing camera technologies to name a few examples, improvement to the efficiency and quality of these systems is very desirable.

Herein for clarity, an "exposure image capture" or just "image capture" refers to image data of an exposure at one level or amount. The multi-exposure image captures are often captured in a single burst of separate exposures that are combined (or overlayed) to form a single frame of image data for statistics and other image processing, whether the single frame is a separate photograph or a frame of a video sequence. Alternatively, image captures may be a number of separate photographs or separate frames in a video sequence each with a different exposure level and being combined to form a single frame of image data for statistics generation and further processing. Also herein, the term exposure itself will refer to the act of the camera performing an integration or exposing a camera sensor to light rather than the resulting image or image data unless the context indicates otherwise.

It will be understood that the representation of a single frame of image data statistics also may be referred to as a single frame's worth of image data statistics being treated as if it has been generated from a single frame even though actually formed from the image data of multiple exposure image captures each of a separate frame or formed initially to be combined to a single frame. Also, the representation of a single frame of image data statistics may be used alone or with other representations of a single frame of image data statistics or one or more actual single frame of image data statistics. For example, the statistics representing a single frame could be used with other statistics of other actual frames to determine an image data value average intensity over multiple frames.

In calculating 3A statistics from an HDR image, merging individual exposure image captures into an HDR image usually involves spatially-adaptive processing where image data of pixel locations of multiple image captures are merged by exposure blending into a single image or frame and further altered by tone mapping for the desired rendering effect. The merging of image data from the multiple image captures for HDR often depends on whether the values of image data of a pixel location indicates a best exposure among the different image captures by revealing content of the image, or in other words, the pixel image data revealing content least washed-out by highlights or shadows (referred to herein as the pixel having the best information). The merging also may depend on the motion and signal-to-noise ratio (SNR) characteristics of individual exposure images in order to minimize motion blur, ghosting artifacts, and/or noise in the resulting HDR image. These operations are based on the image data value(s) of the pixel or image data values in the local neighborhood of this pixel, although the latter is usually more computationally demanding.

Obtaining high quality 3A estimates also requires linear values, which is the proportionality between a value of a pixel and the amount of light measured by a camera. The more consistent the ratio is across all pixels on an HDR image, the better quality and less errors the image will have. The merging of image captures, particularly via spatially-adaptive processing, can create nonlinearities in the HDR data because the merging changes the image data values themselves, whereas 3A algorithms require the linear data for the best accuracy. Any nonlinearity left in the statistics that AEC analyzes results in exposure estimation errors. Specifically, during the operation of an iterative AEC control loop, the estimation errors can lead to overshoots, undershoots, and temporal oscillations. Thus, the statistics for the multiple image captures each with different exposures cannot be accurately calculated from a merged HDR data frame, and the exposure control still needs to be done per exposure image capture.

These errors can be mitigated by increasing AEC stabilization strength in the form of filter tuning which reduces frame-to-frame variations. Such a compensation technique, however, results in longer convergence time to form a single frame of image data for statistics processing due to greater time to process each image capture. This is often inadequate since fast AEC convergence is required in various camera imaging and computer vision applications.

Moreover, the merged HDR image is often passed to statistics processing units in a companded form in order to keep the signal bit-depth manageable for practical hardware and/or firmware implementations. This is mainly due to the large number of bits used to represent the HDR image data compared to individual exposure images which have much lower dynamic range. Each exposure image has to be adjusted (i.e., multiplied with certain gains) for its respective exposure ratio in order to eliminate brightness differences in non-saturated regions in individual exposure images. Depending on the sensor bit-depth and multi-exposure image capture settings (e.g., exposure times, analog and digital gains, the number of exposure images, etc.), it is not uncommon to deal with exposure ratios of 256, 1024, 4096, or even higher. Thus, the HDR image needs to be decompanded to generate the 3A statistics, which increases the computational load and in turn power consumption.

Another statistics generating strategy is to replicate fixed function hardware to generate statistics of each image capture in parallel to maintain clock requirements, and then to provide this parallel hardware (and accompanying firmware structure) for each image data merging technique that is going to be used. Specifically, various HDR technologies may be used that each require statistics formed in different ways. One such technique is digital overlap (DOL) which combines parts of image captures with different "best" exposure regions, such as a background and foreground, into a single frame. Another technique is spatially-varying exposure (SVE) which uses the molecular structure of a camera sensor array to provide varying exposures among adjacent pixels and from a single actual image capture for example. The hardware and/or firmware implementations needed to form the different statistics for each technique also may be substantially different, thereby increasing costs when multiple different techniques are provided, and each technique needs parallel hardware/firmware for each input exposure image capture. While the costs are already high to support multiple exposure merging techniques, the costs increase even more as a function of the number of exposure image captures that are supported by the hardware and software, often becoming impractical.

Also with HDR and other known imaging techniques that use multiple exposures, it may be desirable to add new exposure merging technology to existing systems. In some cases, existing statistics computing hardware and/or firmware implementations could be modified to add support for additional exposure inputs as long as it still supports all other use cases being used. However, such modification of hardware and firmware that performs the statistical computations can become very complex and expensive. Whether the hardware modification is even possible also depends on the type of system because some systems have structure that is particularly difficult to modify due to the complexity of compute and scheduling operations in existing implementations. Also, some statistics computation hardware cannot be modified by changing the hardware such as when the hardware already has been sold and used for many years, and it is not practical to modify the hardware rather than simply providing new technology.

Another option is to add hardware or firmware, such as by adding a downstream DOL HDR merge, to a system with hardware that already provides one or more different types of other HDR merges. For instance, a digital signal processor (DSP) in firmware could be added to the system to support this new HDR merge technique and the associated statistics formation technique. This, however, would lead to longer latencies and more DSP compute spent.

To resolve these issues, a method and system disclosed herein combines pixel image data from multiple exposure image captures to form a single representation or frame of image data to provide a data stream that is to be used to generate 3A and/or non-3A statistics. The data stream in the form of the single frame's worth of image data is both accurate in terms of information content and efficient in terms of the amount of data provided for the amount of hardware and/or firmware needed to perform the processing that generates the statistics from the single frame representations.

This is achieved by introducing an exposure image capture mapping unit, or by one example referred to as a ColorID mapper, to re-arrange and sample a multi-exposure image capture data stream that is input to statistics generating hardware. The method is at least partly based on the fact that not all color components of the pixels, as defined by a color filter array (CFA) pattern such as with a Bayer filter for one example, are needed for all of the exposure image captures. Specifically, selection of image data of a pixel location on an image capture to be placed into the single frame for statistics generation may depend on the exposure level (or exposure level) of the image capture, and the color of the pixel location, and in turn the position of the pixel location, relative to a color filter array (CFA) pattern used to form the image captures. For one specific example, for AEC to correctly expose the full dynamic range, the shortest (minimum) and the longest (maximum) exposure image captures are found to be more important than the intermediate exposure image captures. In this case, when a Bayer CFA is used with blue, green, and red pixel locations, pixel image data of all the colors may be obtained from the maximum and minimum exposure level image captures while only green and red, or only green alone, are obtained from the intermediate exposure level image captures as one example described below. The selection of pixel image data for inclusion in a single frame to be provided for statistics generation does not depend on the values of the image data itself, and these values may be preserved during the transition from multiple image captures to the single frame.

Consequently, the resulting data of the single frame may be substantially linear and therefore highly accurate, and the relevant components of the original exposure image capture data can be used to generate statistics using the same hardware and/or firmware for different HDR techniques, such as when both DOL and SVE are available on the same device, thereby significantly reducing the hardware footprint needed and in turn, material costs as well as costs for hardware validation of each statistics type generated.

The proposed method also enables more accurate camera control for multi-exposure HDR use cases by enabling separate statistics for the different exposure image captures since the single frame contains data of the separate exposures with good accuracy.

The method herein also takes advantage of the linear domain bit representations in other ways since the image data values themselves do not need to be disproportionately modified in order to form the single frame. This reduces computational load and in turn avoids an increase in convergence time since the data for 3A statistics blocks does not need to be decompanded and is free of nonlinearities introduced through an HDR merge. The method is suitable for both single-captures (photographs) and multi-frame captures (video), as it can produce the output representative of all input exposure image captures. It also can be used as a stand-alone solution or implemented as part of an HDR merger through unique combinations of the techniques described herein.

The method also enables flexible input-to-output mappings by having the mapper unit output blocks in a format that is compatible with existing statistics generating hardware blocks for the different HDR techniques. This is accomplished by using a descriptor code to track the selection and position of pixel locations selected from the multiple exposure captures and placed into output blocks of the single frame for output from the mapper and input to the statistics generation units. With this arrangement, the input blocks do not need to be the same size as the output blocks to be provided for statistics generation, thereby creating substantial flexibility.

The present method and system avoids the need to modify existing complex statistics generating hardware and firmware of conventional systems themselves, and enables the combining of exposure image captures to form a single frame for statistics generation as described herein simply by adding the mapping unit, as DSP firmware by one example, upstream from, or in front of, the statistics generating hardware and/or firmware.

Referring now to FIG. 1, an image capture and processing system 100 is provided to operate the method of multi-exposure camera statistics generation disclosed herein and to form a single frame of image data from multi-exposure image captures to be used as input for statistics generation. The system 100 may have a camera sensor 102 capturing light from a scene 101 through a lens 114 and may have a pixel sensor array covered by a physical filter array with a pattern that assigns colors or brightness levels to particular pixel locations so that only light of a certain type can be sensed by a pixel sensor at a certain location on the pattern. An example and one of the most popular filter arrays is a color filter array (CFA) such as the Bayer filter mosaic (or just Bayer) although others may be used that provide grayscale or other color and/or brightness patterns. The Bayer filter typically provides a repeating quad pixel pattern of 2×2 pixels where the top two pixel locations of the quad sense green and then red, and the bottom two pixel locations sense blue then green creating a diagonal pattern of green pixel locations (referred to as RGGB, see FIG. 5). Other color alternatives include CYGM (cyan, yellow, green, magenta), RGBE (red, green, blue, emerald), CMYW (cyan, magenta, yellow, and white where the white is unfiltered), or RCCB (red, clear, clear, blue, where clear refers to unfiltered light).

Also as mentioned, the camera sensor 102 may capture multiple image captures each with a different exposure. This may occur by activating a multi-exposure mode that quickly captures the multiple image captures in a "burst" of captures for a scene being photographed or video recorded such as by opening and closing a mechanical or electronic shutter multiple times in covering a duration usually reserved for a continuous exposure of a single frame. Otherwise, separate image captures each of a separate frame, such as separate photographs or separate frames of a video sequence, may be used and stored as the multiple image captures to be combined when each image capture has a different exposure. By another alternative mentioned below, a single input SVE-type of frame may be captured and provided with varying exposures from pixel to pixel on the input image. The pixels with the same exposure may be grouped and treated as a virtual exposure image capture as described below. Multiple image captures also can be obtained by sensors with (dual) conversion gain technology, where certain exposure images may be exposed identically, but will result in different signal strength, and thus saturation effects, depending on the settings of their conversion gains.

The camera sensor 102 then provides sensor signals that are digitized into raw image data that indicates a color and/or brightness of each pixel location for each image capture 104 that is each provided for processing and statistics. The raw image captures 104 are then provided to both an image processing pipeline 110 and to a multi-exposure mapping unit 106.

The multi-exposure mapping unit 106 performs many of the operations of the method described herein to generate a single frame from the multiple-exposure image captures 104 depending on the configurable exposure image capture combinations and available color channel architecture as described herein. As described below, a colorID mapper of the mapping unit 106 selects the image data of pixel locations from the multiple image captures for inclusion in the single frame depending on exposure level of the image capture and either the assigned color of the pixel location or position of the location on the filter pattern, and in one form, without analysis of the image data values themselves. The mapping unit 106 has an index formula that determines a specific output pixel location address within an output block for an image-wide (or frame-wide) output block coordinate input to the index formula. A descriptor code is pre-assigned to each output pixel location address within the output block. The descriptor code, which indicates an exposure level of an image capture and input block coordinates, is then used to select the input pixel of an input image capture for inclusion at the corresponding output pixel address in the output block of the single frame. The details are provided below.

The statistics unit 108 receives the single frame of image data from the mapping unit 106 as an efficient and accurate representation of a set of the multiple image captures. The statistics unit 108 generates or collects the 3A and other statistics needed for image processing for image refinement. The statistics are then provided to a camera control and image processing algorithms unit 116 to modify camera parameter settings which are then applied in the camera sensor 102 to capture new multi-exposure data. The camera control and image processing algorithms unit 116 may be in the form of CPU code, microcontroller, FW/HW implementations or any combination of these.

The statistics unit 108 generates statistics of the 3A features including AEC, AWB, and AF, and also may collect statistics for other camera and image processing functions. Particularly, with regard to automatic exposure control (AEC), AEC is used to automatically compute and adjust the correct exposure necessary to capture and generate a good quality image. Exposure is the amount of incident light captured by a sensor. The AEC also may calculate analog gain, and digital gain when present, that amplify the raw image signal that results from the used exposure time. Together the exposure parameters determine a total exposure time referred to herein as the total exposure. The gains impact a signal level, or brightness, of the RAW image that comes out from the camera sensor. If the total exposure is too short, images will appear darker than the actual scene, which is called under-exposure, and can be so under-exposed as to become lost if the signal is less than a noise floor, or is quantized to zero. On the other hand, if the total exposure is too long, the output images will appear brighter than the actual scene, which is called over-exposure. Both cases may result in a loss of detail resulting in a poor quality image.

The AEC statistics may include luma histograms or other intensity measurement maps, low resolution representation of the raw image, and by one example in the form of low resolution local or global luminance histograms for a frame's worth of data to be used to compute an average brightness of a frame in order to then generate a digital gain and an analog gain, and in turn an exposure time. These statistics also may be used by the other 3A controls as well.

AWB is used to provide accurate colors for pictures reproduced from captured images. AWB is a process that finds or defines the white color in a picture or the white point of an image. The other colors in the picture are determined relative to the white point. The AWB adjusts the gains of different color components (for example, red, green, and blue) with respect to each other in order to present white objects as white, despite the color temperature differences of the image scenes or different sensitivities of the color components. With regard to automatic white balancing (AWB), methods such as color by correlation, gamut mapping, grey-edge, and/or grey-world AWB can be used to determine the white point and RGB gains. The 3A statistics used may include color averages for each color component (low resolution representation of the raw image).

Automatic focus (AF) automatically adjusts the camera lens 114 position to provide the proper focus of the objects in a scene being video recorded. In various implementations, digital cameras may use phase detection autofocus (PDAF also referred to as phase autofocus or phase based autofocus), contrast based autofocus, or both. Phase detection autofocus separates left and right light rays though the camera's lens to sense left and right images. The left and right images are compared, and the difference in image positions on the camera sensors can be used to determine a shift of a camera lens for autofocus. Contrast autofocus measures the luminance contrast over a number of lens positions until a maximum contrast is reached. A difference in intensity between adjacent pixels of the camera's sensor naturally increases with correct image focus so that a maximum contrast indicates the correct focus. Other methods for AF may be used as well.

In order to determine a compensating lens shift when using this technique, the 3A statistics includes a contrast or gradient map and sums thereof, and of the frame for contrast autofocus and/or a map of pixel pair intensity or color differences of left and right images for phase detection autofocus. Thus, the 3A statistics for autofocus may include a contrast or gradient map (and/or sums thereof), the differences in left and right phase images, up and down phase images, sharpness values, and/or contrast values. A low resolution representation of the image may be used as well to represent the intensity levels of the image signal.

Other general statistics that may be generated whether for use for 3A operations or other functions may include luminance and/or chrominance averages, luminance and/or chrominance high frequency and texture content, motion content from frame to frame, any other color content values, picture statistical data regarding deblocking control (for example, information controlling deblocking and/or non-deblocking), RGBS grid, filter response grid, and luminance or RGB histograms to name a few examples. One specific type of general statistics can be used for local or global tone mapping (LTM or GTM) techniques to produce the desired image rendering effects for example, or could be used for other algorithms.

Once the statistics are generated, 3A algorithms are applied by the camera control and image processing algorithms unit 116 to obtain meaningful adjustment values to apply to the image data of the single frame. For example, the AWB computations may form color gains and a white point, which then may be used to modify the image data of the single frame, and specifically the chroma, and/or luminance values of the image data, in lens shading correction computations or in actual white balancing of the input image(s) for example. The modified image data of the single frame then may be provided to the image processing pipeline 110 to further refine the image data and prepare for, or perform, rendering of the image, transmission of the image such as by encoding, or storage of the image for later use. Otherwise, the AEC statistics mentioned above are used to determine exposure camera parameter settings and then provide those parameters to the image sensor 102 to set the exposure parameters to capture a subsequent image.

Similarly, AF setting determinations based on the statistics described above are provided to the camera module 112 to adjust lens 114 positions for a subsequent capture. In one form, the camera control and image processing algorithms unit 116 may have or communicate with a lens driver with i2c protocol that forms the commands for new focus settings, and then sends the new AF settings to the camera module 112 so that lens hardware on the camera then may move the lens. The lens hardware may or may not be considered a part of the module 112 or lens 114.

Figure 2:
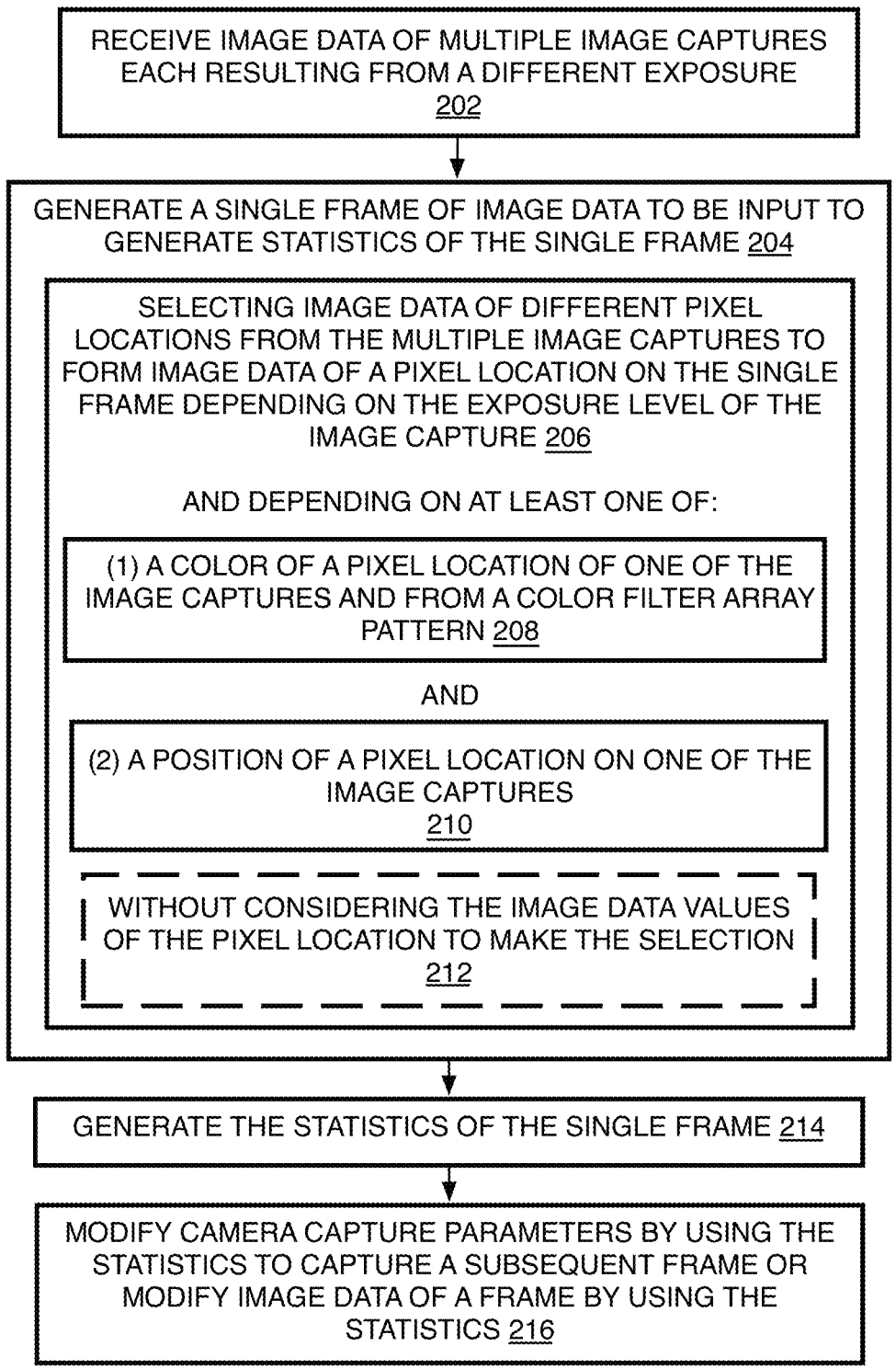
FIG. 2 is a flow chart of a method of generating multi-exposure camera statistics in accordance with at least one of the implementations herein.

Referring to FIG. 2, an example process 200 for multi-exposure camera statistics generation for image processing described herein is arranged in accordance with at least some implementations of the present disclosure. In the illustrated implementation, process 200 may include one or more operations, functions or actions as illustrated by one or more of operations 202 to 216 numbered evenly. By way of non-limiting example, process 200 will be described herein with reference to any of the example image processing systems described herein and where relevant.

Process 200 may include "receive image data of multiple image captures each resulting from a different exposure" 202, and particularly, camera systems such as SLR or HDR are able to take a burst of multiple shots (or image captures) within the time to capture and form a single frame. The exposures within the burst are intentionally each a different duration in order to capture a different amount of light with each image capture. By the examples herein, three or four exposure image captures are generated to form a single frame, although other number of image captures could be used. By other examples, multiple separate frames may be captured each by an image capture that has a different exposure duration. The effect may be the same as with a burst of multiple image captures for a single frame when these separate frames are combined. It should be noted that yet in another alternative, some camera systems can provide a single frame with multiple different exposures from pixel to pixel on the same single frame. In this case, the pixel locations with the same exposure duration may be considered single image captures to combine to form a single frame for statistics generation. The description of this option is mentioned below.

Herein, receiving the image data also may include receiving raw image data and performing some early pre-processing operations sufficient to perform the statistics generation as described below. With regard to the image processing, the entire statistics generation and the performance of 3A algorithms and other statistics-based computations may be considered pre-processing for major image processing tasks such as rendering and/or encoding of the image data for example.

Process 200 may include "generate a single frame of image data to be input to generate statistics of the single frame" 204. First, this may include "select image data of different pixel locations of the multiple image captures to form image data of pixel locations on the single frame depending on the exposure level of the image capture" 206. Thus, the exposures may be defined as long, medium, and short, when three exposure image captures are being used, or an additional very short exposure may be added when four exposure image captures are used. The pixel image data is selected from the image captures depending on which exposure the pixel image data is on. As mentioned, it has been found that the image data, such as color or chroma data on image captures with the longest and shortest (or maximum and minimum) exposures, are more important than on the image captures with intermediate exposure levels. Thus, these operations are performed across the single frame with careful consideration of which exposure levels are being used.

Accordingly, the selection of image data on the image captures also may depend on "(1) an assigned color of a pixel location of one of the image captures and assigned from a color filter array pattern" 208. For example, pixel locations of blue and/or red can be dropped on the intermediate exposure levels with small if any reduction in image quality when a tri-color RGB Bayer filter pattern is being used. When three exposure image captures are being used, only the green and red pixels may be selected from the intermediate exposure image capture, and when four exposure image captures are being used, only the green pixels may be selected from the intermediate exposure image captures. Other variations may be used as well.

From another perspective, it may depend on "(2) a position of a pixel location on one of the image captures" 210, and particularly when a fixed CFA color pattern is used, such as the Bayer filter, so that certain pixel locations on the image captures are known to be certain colors. By one example approach, a code may be used to assign the pixel location coordinates on an input image capture to pixel location addresses within an output block on the output single frame to effectively place the image data from the input pixel location in the single frame. This may be performed by using an index formula to determine an output block address of an image-wide pixel location of the single frame, and then obtain a descriptor code that was pre-assigned to the determined output block address from a predetermined descriptor code order for an output block. The descriptor code at least includes the input coordinates within an input block from one of the image captures and can be converted to image-wide coordinates of the image capture. By one form, the descriptor code also may indicate which exposure image capture the image data is being extracted from. The image-wide output single frame pixel coordinates and the corresponding image-wide input pixel coordinates can then be placed in a single frame index to populate the single frame with the input image data when needed.

Thus, these operations also may include "without considering the image data values of the pixel location to make the selection" 212, and particularly by one approach, this combination of pixel data from the different exposure image captures is performed without a determination as to which pixel locations are providing better exposure-based image data (best luminosity levels for example as explained above). Better quality images are usually obtained when the statistics can be collected from original exposure images rather than their adaptively modified versions because those original exposures are often the result of a previous AEC iteration, and then it is possible to cleanly observe that result as it is in order to make the best selection for the next exposure parameters. Alternatively, the operations herein could be combined with methods that evaluate the image data values themselves.

Once the single frame is formed and ready for statistics generation, process 200 may include "generate the statistics of the single frame" 214. In other words, the gathered image data that represents a single frame may be used to generate 3A statistics for autofocus, automatic exposure control, and/or automatic white balance. This also includes statistics that are generated after obtaining data from other operations such as after LSC operations by one example. Otherwise, the gathered image data that represents a single frame may be used to generate general statistics to be used to perform other non-3A functions. This may include functions such as digital video stabilization, local or global tone mapping, or other methods of low to high dynamic color conversion or other functions to name a few of many possible functions. The data of the single frame may be provided block by block when so defined, and may be provided as generated rather than generating and storing an entire frame's worth of image data first before providing the statistics unit access to the single frame.

Process 200 then may include "modify camera capture parameters by using the statistics to capture a subsequent frame or modify image data of a frame by using the statistics" 216, and particularly, the statistics then may be used to perform 3A and other image processing algorithms to refine the image quality such as with AWB parameters being provided for white-balance adjustment and lens shading correction, and/or to determine camera settings for AF and/or AEC, but otherwise may include non-3A based features such as tone mapping as mentioned.

Figure 3:
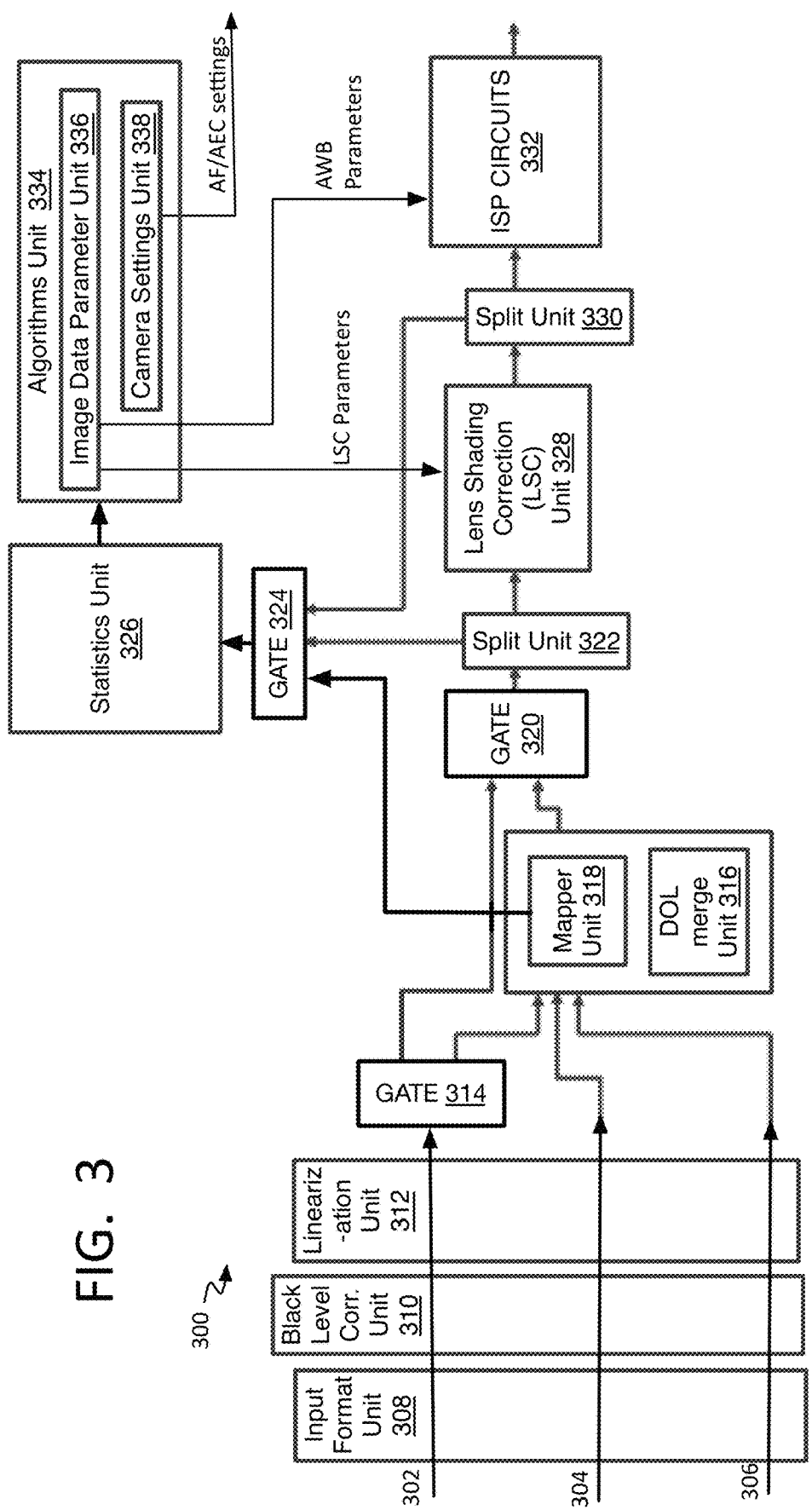
FIG. 3 is a schematic diagram of an image processing device to perform the method of generating multi-exposure camera statistics in accordance with at least one of the implementations herein.

Referring to FIG. 3, an image processing system 300 may operate the multi-exposure camera statistics generation method such as method 400 described below. The components of the system 300 shows software components and hardware blocks that may be a part of a shared or fixed function image signal processor (ISP). It will be understood, however, that a CPU and/or other processor(s) could perform such processing rather than, or in addition to, the ISP. It also will be appreciated that the image data may be held in ISP registers while statistics are generated, or other tasks are performed. The registers may be registers of more than one ISP, and/or registers of another type of processor (CPU, and so forth). The ISP may be part of a system on a chip (SoC) or other architectures. In addition to registers, the image data and statistics may be held on other memories that are at least more local then an off-chip RAM, DRAM, or other type of RAM whether an ISP or other processor that is performing the statistics generation or analysis. This may include on-chip memories that are on the same chip or board as the processor.

The system 300 receives raw image data of a number of multiple-exposure image captures, here being three, 302, 304, and 306, and each formed by using a different exposure level. Example exposure levels include E, E×8, and E×64, in which E depends on the ambient illumination level and camera properties. The exposure image captures may be generated from a single burst for a single frame or separate frames as mentioned above. The preparation of the image data of the image captures and the combining of the multiple image captures into a single frame is performed so that the single frame can be provided to a statistics generation unit (or 3A statistics or just statistics unit) 326. All of these operations may be considered a part of pre-processing relative to the tasks of ISP circuits 332 such as rendering or compression of the image data. The exposure image captures also are provided from sensors using a CFA or similar filter system or operation as described above.

Early pre-processing operations may be performed on the image captures to prepare the data for combining into a single frame and statistics generation. Accordingly, the image captures 302, 304, and 306 separately may be provided to an input format unit 308 that can crop the image and adjust the bit-depth of data, a black level correction unit 310, and then a linearization unit 312 that can compand and/or decompand the data and correct sensor nonlinearities. It will be appreciated that the linearization here cannot usually compensate for nonlinearities due to an HDR merge.

The example structure provided for system 300 shows that DOL techniques may be used in the alternative to the image capture combination method disclosed herein. Thus, three options are shown here. A bypass is provided from a gate 314 to a gate 320 so that a single image capture or frame can be provided when a multi-exposure mode is not being used. By another option, a DOL merge unit 316 receives all of the multiple exposure image captures, and determines which region has the best exposure among all of the image captures for that region. The DOL unit 316 then combines the best region from among the image captures onto a single frame for statistics generation and image processing. The output frames from the DOL unit are then provided to the gate 320 as well. It should be noted that different imaging architectures may use the DOL merge unit 316 and a mapper unit 318 as stand-alone solutions rather than integrated in a single processing block as shown. Thus, the mapper unit 318 may take the data before a DOL merge, even when it is implemented inside the same hardware or firmware block as a DOL merge.

To implement the options provided herein, the mapper unit 318, which may be a colorID mapper unit 318 when color is the differentiator as with a Bayer filter and as described herein, may receive each of the image captures, and then selects image data of pixel locations on the image captures for inclusion onto a single frame for statistics and processing by using a descriptor code to select input pixel locations and place the selected input image data in output blocks of an output single frame also as described herein. By one form, the image data of the output single frame, where here output is relative to the mapper unit 318 itself, may be provided block by block, such as 4×4 pixel blocks at 16 bpp (bits per pixel) as expected by the statistics unit 326, although other block or single pixel locations could be used instead when desired such as 1×1, 2×2, and/or 2×4 pixel blocks to name a few examples. Similarly, the number of bits per pixel (e.g., 8, 12, 16, etc.) may vary in different architectures or even throughout the image processing pipeline. By one example, the statistics unit 326 may expect 2×4 pixel blocks from the mapper with pixel locations or types 0 to 7 (or in other words, designated ColorID values 0 to 7). The same block by block stream may be provided with SVE DOL sensors (when SVE is provided by the system 300 in addition to or instead of the DOL unit 316) without a DOL merge block (typically for 4×4 blocks and max 8 ColorIDs [0,7]), or a regular Bayer sensor (for 2×2 and max four color components with ColorIDs [0,3]), or monochrome sensor (for 1×1 for 1 color component with only ColorID 0) to provide monochrome image data. The mapper unit 318 may use any of these block sizes and image data formats as well.

The output single frame of image data is provided block by block from the mapper unit 318 and to the statistics unit 326 for analysis by 3A algorithms via the gate 324. Some statistics hardware can use the mapper unit 318 output from gate 324, and some can use data obtained from split unit 322 or 330 output. Typically AEC and AWB statistics would be taken from mapper unit 318 in order to see the separate exposures, but AF statistics may be taken from split unit 322 or 330 in order to get the best resolution in pixel level (AEC and AWB statistics are not usually impacted by the re-ordering of data that is done by the mapper unit 318, but convolution filters used by AF statistics may be impacted). On the other hand, the output single frame from the DOL merge block 316 is provided to gate 320 to provide lens shade correction data and undergo remaining processing steps (noise reduction, white balancing, and tone mapping for instance) in the imaging pipeline.

As to the flow with regard to gate 320 specifically, a split unit 322 receives the data from the gate 320 and provides a black-level corrected (non-lens shading corrected) image to the 3A statistics unit 326 via a gate 324, and to a lens shading correction (LSC) unit 328. The non-lens shading correction image data can be used to calculate the lens shading correction parameters.

A split unit 330 then provides the LSC corrected image data to both the gate 324 and the subsequent ISP circuits 332 for further image processing whether to complete pre-processing of the image data, or render, store, or encode the image data for transmission. The operations that may be included in the further pre-processing are mentioned below with process 400.

The gate 324 may provide the non-LSC and LSC image data as well as the single frames from the mapper unit 318 to the statistics unit 326. The statistics unit 326 may have hardware with a configuration that is arranged to expect a certain image data format (block size and arrangement of block pixel data), and expected from the mapper unit 318 as well as the other units providing image data to the statistics unit 326 (whether the expected format is the same or not from unit to unit). As mentioned, two examples are a 2×4 format (colorID values 0 to 7, or a Bayer format with colorID values 0 to 3). The statistics until will be configured to expect pixels in certain position on the received blocks of the single frame to have expected colors as well so that descriptor codes do not need to be transmitted from the mapper unit 318 to the statistics unit 326, but could be is desired.

The statistics unit 326 may receive the image data and computes the desired various 3A and non-3A statistics. The statistics are then provided to for 3A, and other computations, to an algorithms unit 334 that has an image data parameter unit 336 to compute parameters that are used for image processing refinement as part of image pre-processing operations. This may include computing and providing AWB white point and gains for example, that are then provided to ISP circuit 332 for further processing, while LSC parameters are provided to the LSC unit 328. A camera settings unit 338 may use the statistics to compute AF and AEC settings parameters, which are then provided to a focus camera control or camera module and sensor array control respectively that adjusts the focus and exposure levels for capture of subsequent images. Other variations and features may be modified as well.

By one form, the generated statistics are stored in a memory, such as RAM or DRAM, along with the image data so that an ISP can retrieve the statistics from the memory to use the statistics to compute new 3A or other image capture parameters or can use the statistics to modify image data for display of a frame. Other data in addition to the chroma and luminance data in the raw image data may be stored in memory, such as exposure data including the exposure time, and analog and digital gains. This data also is then provided to the statistics ISP hardware as needed to generate statistics and/or new 3A or other parameters.

Figure 4A:
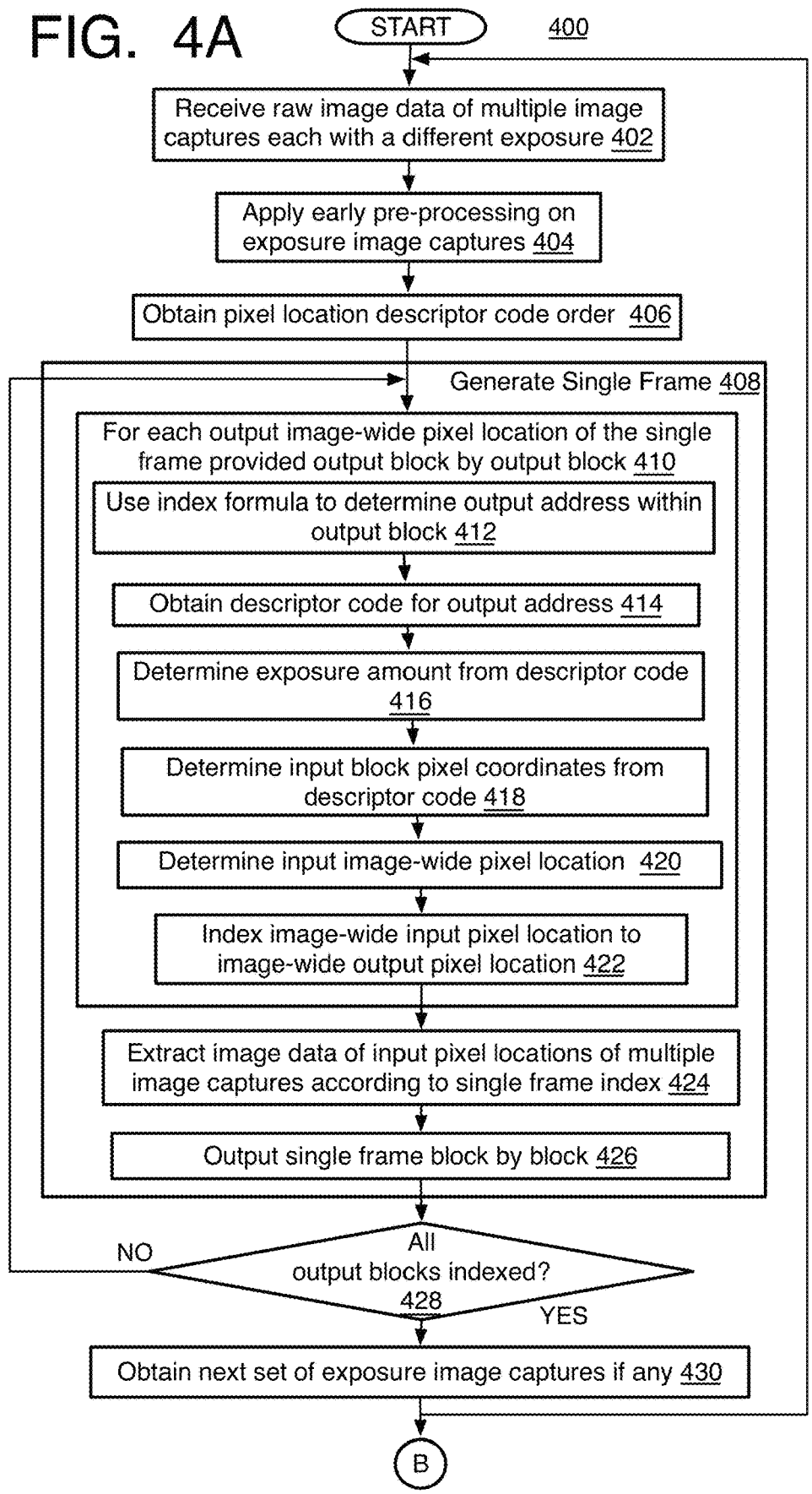
FIGS. 4A-4B is a detailed flow chart of a method of generating multi-exposure camera statistics in accordance with at least one of the implementations herein.
Figure 4B:
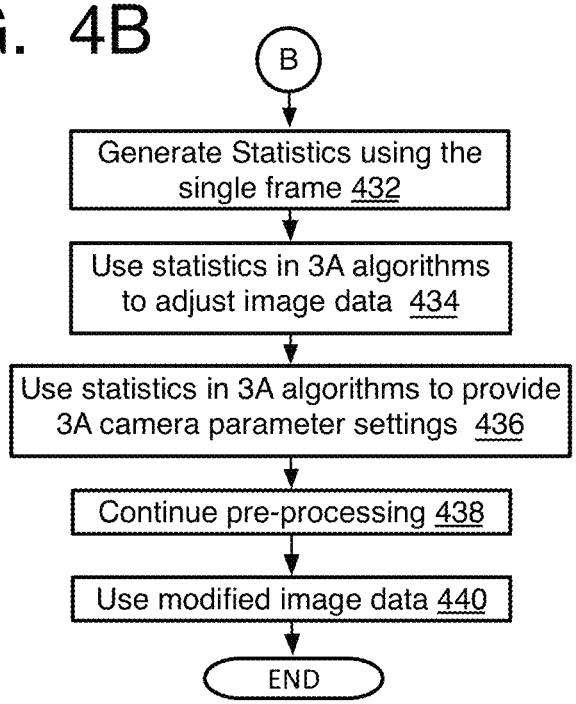

Referring to FIGS. 4A-4B, an example process 400 for multi-exposure camera statistics generation for image processing described herein is arranged in accordance with at least some implementations of the present disclosure. In the illustrated implementation, process 400 may include one or more operations, functions or actions as illustrated by one or more of operations 402 to 440 numbered evenly. By way of non-limiting example, process 400 will be described herein with reference to the image processing systems 100 or 300 described herein and where relevant.

Process 400 may include "receive raw image data of multiple image captures each with a different exposure" 402, and this is already described above with process 200 and systems 100 and 300. As mentioned, while RGB colors are mainly used for the example herein, the image data may be provided in grayscales, luminosity levels, or other color scales of various filter arrays or other mechanisms used for capturing images.

Process 400 may include "apply early pre-processing on exposure image captures" 404, and at least early pre-processing operations that should be performed before combining the exposure image captures. It should be noted that actually all such operations that determine camera setting parameters and image quality refinement based on the 3A and other statistics, including the lens shading correction, can be considered pre-processing itself for subsequent ISP pipeline operations such as demosaicing, noise reduction, color space conversion, image rendering and encoding of the image data. The pre-processing performed before exposure image capture combination may include the formatting, black level correction, and pixel linearization mentioned above with system 300. Other pre-processing that could be performed before exposure image capture combination may include noise reduction, vignette reduction, and defective pixel correction, for instance.

Process 400 may include "obtain pixel location descriptor code order" 406, and the order may be obtained from mapper unit firmware or other memory as mentioned above. The order discloses a list of pixel location addresses within an expected output block (or other unit) that is to be analyzed together by the statistics unit as part of the single frame of statistics, and depending on color, grayscale, brightness, or other factor other than the image data values themselves by one option. By one form, the expected block may be 4×4 pixels, 2×4 pixels, 2×2 pixels, and so forth, and may or may not be the same size block that holds the input pixel image data received by the mapper unit as explained below. As mentioned for the example here, colors may be used and are based on an RGGB Bayer filter pattern, and the descriptor code order lists the index of the exposure image data that is to fill a particular output pixel location on an output block of a single frame being formed as well as a pixel location output address within the output block. An index formula may be used to convert the image-wide output pixel locations of the single frame to output block pixel location addresses as described below. Each such address within the output block has a pre-assigned descriptor code from the descriptor code order. The results of the index formula is the argument or input to a descriptor order operator, such as oStream, that looks up the matching descriptor for a particular address of an output block. An example descriptor code order (or list or index) 900 (FIG. 9A) shows one sample order filled with descriptor code values, which are explained in the process for generating the single frame to be provided for statistics generation.

Process 400 may include "generate single frames" 408, and as mentioned, is performed by assigning input pixel location coordinates of image data on the image captures to output addresses on an output block of the single frame. Thus, process 400 obtains an image-wide pixel location coordinate of the single frame and determines which input pixel location of an image capture should provide the input image data to be assigned to that image-wide pixel location. This then may be repeated first for each output pixel location in an output block, and then repeated block by block for the entire single frame. Accordingly, process 400 proceeds "for each output image-wide pixel location of the single frame provided output block by output block" 410.

Referring to FIG. 8, process 400 then includes "use index formula to determine output address within output block" 412, and in other words, determining an output block pixel location address from an image-wide single frame pixel coordinate that is to be populated by the input image data. This is accomplished by using a configurable index formula, which in this example provides an array of sixteen pixel addresses forming the 4×4 output pixel blocks. One example configuration, indexing, and notation of an output 4×4 block 800 is shown based on the range of addresses from the index formula including an index 0 to 15 of array elements or addresses on the output block 800 and that indicates the spatial position (i.e., [00, 01, 02, 03, 10, 11, 12, 13, 20, 21, 22, 23, 30, 31, 32, 33] on the output block, with the first digit indicating the row coordinate and the second digit indicating the column coordinate) in the 4×4 pixel block 800 of the single frame. By one example, the index formula may be:

$$A = 4(\text{row } \%4) + \text{col}\%4 \qquad (1)$$

where % is the modulo operator, (row, col) is the image-wide coordinates of the pixel location on the entire output single frame that is to be populated, and particularly for a single output pixel location of the small frame where row=0 to height −1 and col=0 to width −1 for the height and the width of a single frame, and A is the output pixel location address having a range of 0 to 15 for a 4×4 output block 800, thereby converting the image-wide output coordinates of a pixel location to an address relative to, and within, an output block. As described below, this formula is the argument for a descriptor code operator, such as oStream, that looks up a pre-assigned descriptor code corresponding to the address A. It should be noted that this formula is adaptable for almost any output block size where in the formula in eq. (1), if b(row % a)+col % b, then a and b represent the dimensions (i.e., the number of rows and columns) of the output block.

Figure 5:
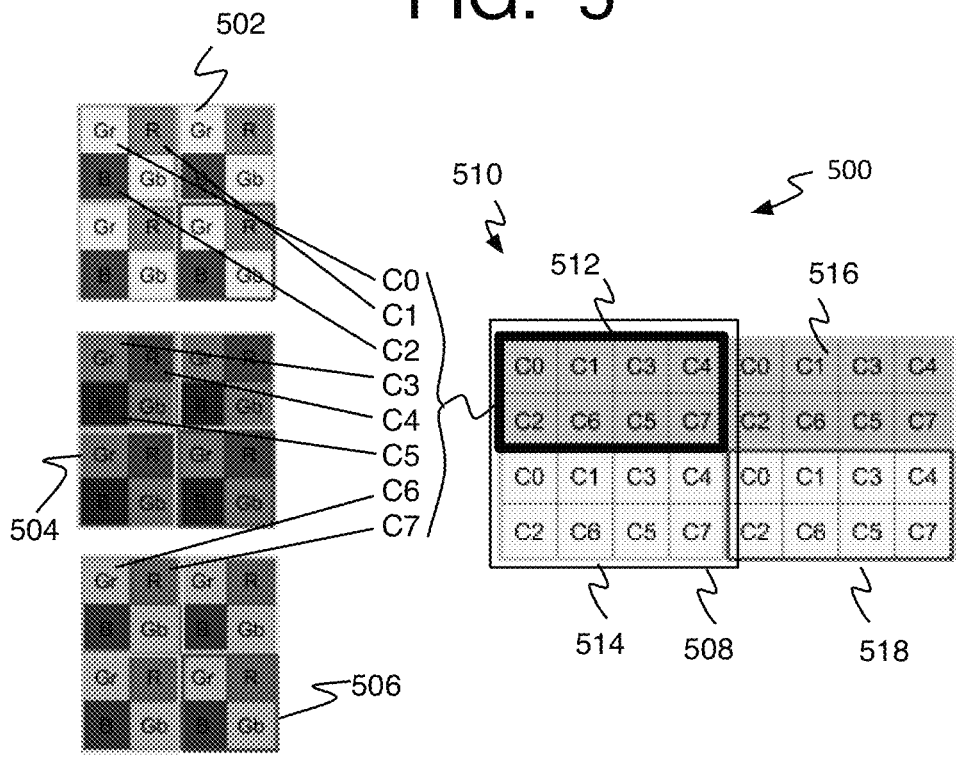
FIG. 5 is a schematic diagram demonstrating pixel selection in accordance with at least one of the implementations herein.
Figure 6:
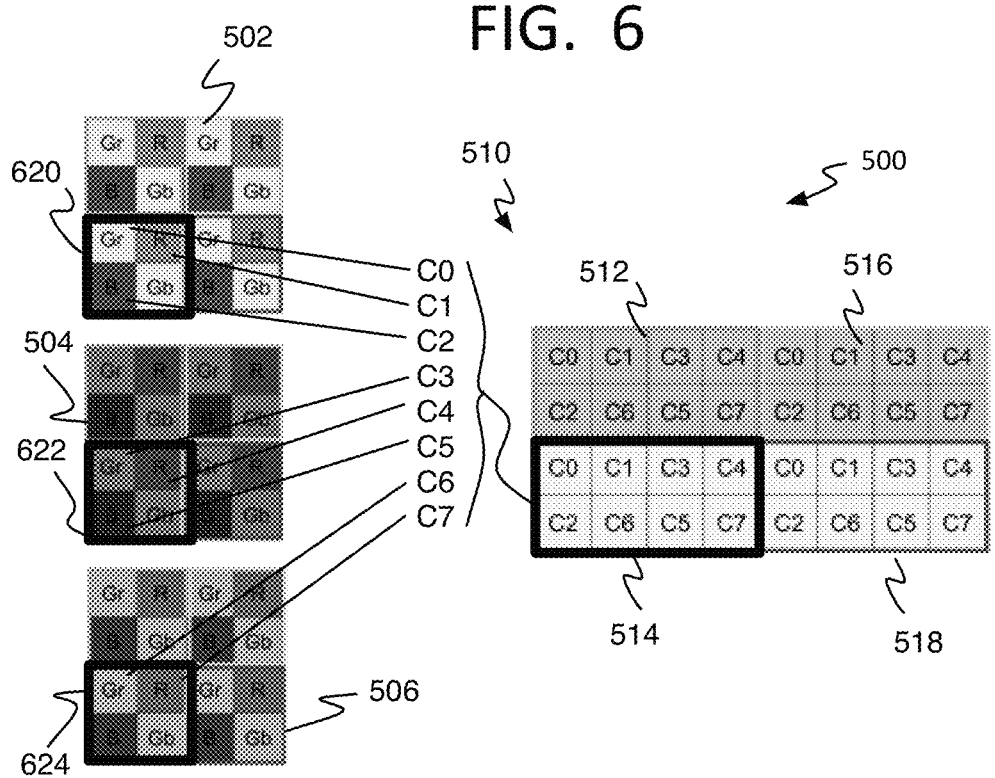
FIG. 6 is another schematic diagram demonstrating pixel selection in accordance with at least one of the implementations herein.

Referring to FIGS. 5-6, process 400 then may include "obtain descriptor code for output address" 414. To understand how the descriptor code order is assigned to an output block address, an understanding of the possible output pixel patterns, and the basis for the selection of pixels for inclusion in the output block is explained first. One example pixel block mapping diagram 500 shows the mapping of three input 4×4 pixel blocks respectively from three exposure image captures: a long (or brightest or maximum) exposure image capture 502, a short (or dark or minimum) exposure image capture 504, and an intermediate (or middle) exposure image capture 506 for a Bayer CFA data stream, and to a single output frame 510 that is to be provided to the statistics generation unit. By this example, each 2×2 small input block on the input image captures has a Gr (green) upper left pixel, a R (red) upper right pixel, a B (blue) lower left pixel, and a Gb (green) lower right pixel), although many other patterns could be used.

The block dimensions and the number of exposure images to be represented in a single stream can be arbitrary positive integer numbers. The output block 508 can be smaller than the input blocks 502, 504, and 506. In the example here, however, both input and output blocks have identical dimensions of 4×4 pixels, and the number of exposure image captures in a multi-exposure image capture is limited to four maximum which is used in conventional automotive HDR camera, although three are used here, and although more could be used depending on the application. Thus, each 4×4 pixel block 502, 504, and 506 in individual exposure image captures is represented with a single 4×4 pixel output block 508 of output pixels in two repeating 2×4 patterns or sub-blocks 512 and 514 each with pixel locations C0 to C7. This ensures that the output stream of combined input exposures has the same resolution and bit depth as the input exposure images. The 4×4 output pixel block arrangement permits various layouts of exposure and color indices, such as one instance of a 4×4 pixel layout or two instances of 2×4 pixel layout with the same exposure and color pattern, but different spatial indexing for each 2×4 pixel layout for advanced configuration flexibility.

Also as mentioned, since it has been found that the longest and shortest exposure image captures contribute the best pixel image data information, one pixel location of each color from the 2×2 blocks of these image captures are used in the current example. Thus, Gr, R, and B of the long exposure image capture 502 are each used and placed in correspond locations C0, C1 and C2 on the output block 512 as shown. Likewise, the Gr, R, and B pixels of the short exposure 504 are placed in locations C3, C4, and C5 of output block 512 respectively. When three image captures are being combined as shown, the Gr and R pixels of the intermediate (or middle) exposure image capture 506 are placed respectively at the C6 and C7 output pixel locations of output block 512. This particular output layout is just for demonstration purposes, as the method permits any layout supported by or compatible with 3A algorithms.

Alternatively, if four input exposure image captures are received instead of three (long, intermediate, short, and very short exposures), then one green component Gr is selected from each middle exposure image capture for the 2×4 block per middle exposure. Thus, for example instead of the R of image capture 506 going to output pixel location C7, the first upper left Gr of a fourth image capture (not shown) would go to output pixel location C7 instead. The use of the green component per each middle exposure still would be sufficient since the green channel covers most of the visible wavelength range anyway. Good exposure control does not require transferring the blue component for the middle exposure. Also, it will be noted, that in the examples provided, the Gr green is selected instead of the Gb green, but the Gb green could be selected instead, or some mixture of both could be used.

Referring to FIG. 6, a 2×4 sub-block 514 of the output single frame 510 is then filled in the same manner as with output sub-block 512. This mapping may be repeated for each output line pair to form the numerous colorID content blocks with only eight color components which supports 3A statistics generation. Each line pair or 2×4 sub-block 512, 514, 516, and 518 for this example may be filled in the same way, and from different corresponding 2×2 input blocks, such as blocks 620, 622, and 624, from each of the different image captures, although other combinations could be used.

Figure 7:
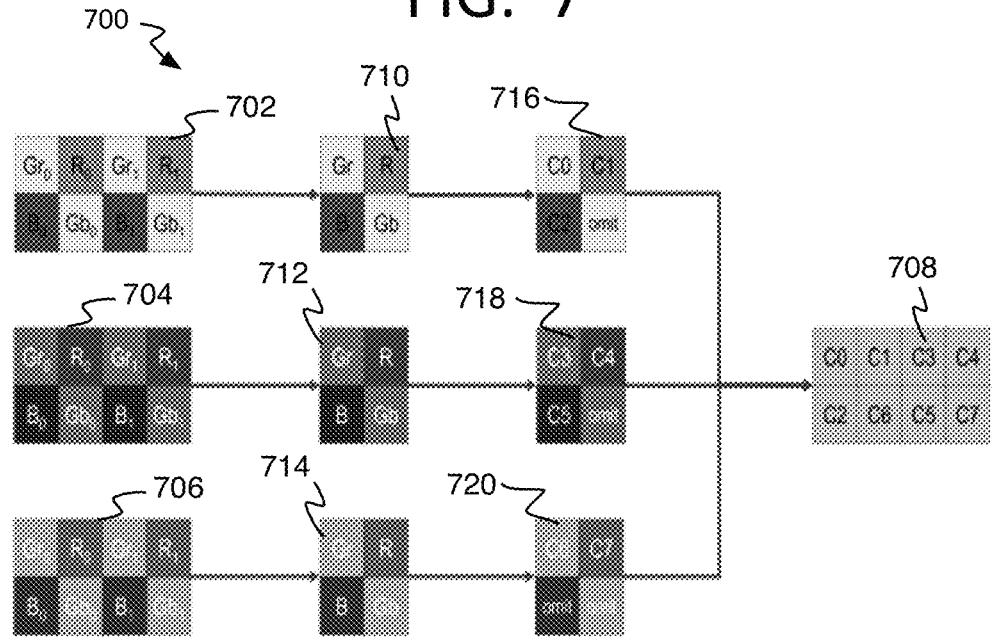
FIG. 7 is a schematic flow diagram to explain a method of generating multi-exposure camera statistics in accordance with at least one of the implementations herein.

Referring to FIG. 7, in addition to pixel selection described above, the output stream can be obtained through pixel averaging as well. For instance, if only 2×2 pixel CFA input data needs to be provided to the statistics unit, then input value on location (y, x) can be averaged with input value in location (y, x+2) within the input 2×4 block, and for each of four pixel locations in 2×2 to form a single 2×2 pixel block from the 2×4 block. For example, a flow diagram 700 shows that a 2×4 input block for a long exposure image capture 702, short exposure image capture 704, and middle exposure image capture 706 may be provided. When each color is averaged along the row with a next similar color location, this forms 2×2 average blocks 710, 712, 714 respectively for the 2×4 blocks 702, 704, and 706. The pixel locations are then used as described above so that the average Gb pixel is omitted from the long and short exposure blocks 716 and 718 to be placed in a 2×4 pixel output block 708 with pixel locations C0 to C7, and the Blue B and Gb pixels are both omitted from the intermediate block 720 that is to be placed in the output block 708. Other options for a four pixel average are provided below. It also will be appreciated that other combinations of pixel image data could be used instead of the average such as a median, minimum, or maximum value among the pixel locations, and so forth.

In addition, a window for extracting the input multi-exposure image capture data can be either non-overlapping or overlapping blocks where every quad (or 2×2) pixel group is analyzed by moving the 4×4 pixel analysis block "window" by less than four pixels, and by one example, by two pixel locations, so it overlaps the last block analyzed. For pixel locations analyzed twice or more due to the overlapping, either the resulting output blocks are concatenated to that the resulting output single frame is larger than the image capture size, or the pixel data of the same corresponding pixel location may be further combined, such as by averaging or some other combination. This may provide representation of more data from the intermediate frames. However, partitioning the input data into non-overlapping blocks in the first place usually provides more efficient representations and generally implies less compute.

Now returning to the operation of obtaining the descriptor code pre-assigned from the descriptor order to a particular address output block pixel location address A, the descriptor code or descriptor for the elements (delm) may be used to track the pixel data and determine which input pixel locations from the input image capture should be used to provide the input image data at a pixel location address A on the output block 800 for example. By one approach, the value of the descriptor code for each input pixel (of each input sensor array element) is a six-bit number zzyyxx, where zz is the exposure index represented in a binary form as 00, 01, 10, or 11 where 00 refers to the image capture with the longest exposure, 01 refers to a medium exposure, 10 refers to a short exposure shorter than the medium exposure, and 11 refers to the shortest exposure. When less than four exposure image captures are used, the actual descriptor code should be formed by using whichever is the correct predetermined intermediate exposure level code that is to be used (so either 01 or 10 could be used for a single intermediate exposure when only three image captures are available as long as it is used consistently).

Referring to FIG. 9B, the two other pairs of bits, namely yy and xx, refer to the row and column coordinates respectively within a 4×4 input pixel block 950 to indicate the input pixel location relative to the block 950 that is to be assigned to the output address A, and in turn, the output image-wide coordinates (row, col) for one of the output pixel locations on the single frame.

Each column and row of 4×4 input block 950 has a two-digit binary code 00, 01, 10, or 11 from left to right or top to bottom, so that each pixel location in input block 950 has binary pair coordinates (row, column) or (y, x) of (11, 01) or 1101 in binary. In case of 2×4 pixel layouts within a single 4×4 pixel block where two 2×4 layouts are provided, yy and xx bits for the same cell in the two 2×4 pixel layouts can be different between the two instances but still constrained to the same color channel, while zz bits are the same in both instances since the zz bits refer to the same exposure.

With this arrangement in mind, the formula of equation (1) described above now can be recited as the argument of the descriptor operator oStream. The actual descriptor code value delm may use the pixel coordinates in an equation to determine the four binary coordinate digits of a six-digit value of the descriptor code delm where:

$$\text{delm}=o\text{Stream}[4(\text{row \%4})+\text{col\%4}]=pla+el \quad (2)$$

where the oStream operator is a C++ computer language implementation-based template for setting a datastream output format, the range of oStream argument will be 0 to 15 (for A) for a 4×4 pixel block and respectively corresponding to the spatial positions 00 to 33 mentioned above on output block 800. Thus, the operation initiated by oStream[A] is to look-up A on a descriptor order index (or list or table), and obtain the pre-assigned six-digit binary delm code that corresponds to the output block address A. Also, as discussed above, the value of delm encodes the exposure index and pixel coordinates within input 4×4 block, where pla is the input pixel location block address and e1 is the exposure level of the image capture the input pixel location should be obtained from. For example, the pla forms the four digit (row, col) binary input block address, such as 1001 as shown on input block 950 and that corresponds to the address A. It should be noted that this descriptor assignment or indexing is based on the CFA patterns as mentioned above and to place a desired color pixel from a desired input block location of an image capture onto a certain location on the single frame. The binary input block address is not computed directly from the value of the descriptor operator argument or A. It will be appreciated that this arrangement can be extended to many variations of CFA patterns and/or sensor configurations.

The e1 in equation (2) is the two digit binary number representing the exposure level but now extended to six digits for addition to the four digit binary output address just for consistency in the equation (2). When the descriptor code is first being formed offline (e.g., when configuring the ISP pipeline), the exposure levels can be seen as 000000, 100000, 010000, or 110000 just for addition purposes to form a complete descriptor code, for example 111001 using the pixel address 1001 and the exposure level 11. It will be understood that the mapper unit may actually simply place the two digits in front of the four digits rather than actually perform the addition when forming the descriptor code order in the first place. The exposure level code could be in many different formats and is not always limited to the two digit binary code used here. The resulting six digit binary code (and in turn, represented as the base 10 number on descriptor code order 900 (FIG. 9A)) is the complete descriptor code.

To demonstrate some possible examples, assume an image-wide output single frame address (row=4, col=7) so that 4(row %4)+col %4=3 as an array index (or address A) corresponding to spatial position 03 on 4×4 output pixel block 80 (note that row 4, col 7 is actually the fifth row and eighth column since row 0 and col 0 are the first row and first column respectively in the single frame). Also, assume the image capture being analyzed has the exposure index 10, which is the shortest exposure being analyzed for three exposure levels and the pixel value is selected from the first row (00) and second column (01) in the input 4×4 blocks. So here delm=oStream[3], and when the descriptor is looked up, the corresponding descriptor may be 100001=100000+0001=100001=33, which corresponds to space C4 in 2×4 block 512 according to the pattern provided by diagram 500 (FIG. 5). Referring to FIG. 9A, the example descriptor code 900 indicates descriptor code 33 is assigned to spatial position 03 for the pattern being used here. By another example, assuming output image-wide single frame pixel location coordinates (row=2, col=1) associated with delm=oStream[9], in this particular case, due to the pattern being used, this is pixel location C1 on diagram 600 in 2×4 block 514 (FIG. 6), and the descriptor code here also is 9 (binary representation 001001) on descriptor code order 900 and from the long exposure (zz=00) and spatial position 21, which corresponds to yy=10 and xx=01 within the input 4×4 pixel block 950. As demonstrated on these examples, the descriptor can be flexibly configured to support various CFA patterns and/or sensor configurations.

The next operation in process 400 is to convert the input block pixel coordinates into image-wide input image capture coordinates so that the image-wide output coordinates can be indexed according to the image-wide input coordinates. Other indexing formats could be used but the image-wide coordinates are used due to the simplicity and effectiveness of the coordinate mapping. Thus, process 400 may include decoding the descriptor and that may involve "determine exposure level from descriptor code" 416, where the first two (or e1) digits of the obtained descriptor are read as described above, and then "determine input block pixel coordinates from descriptor code"418, which involves reading the last four (or pla) digits of the descriptor to obtain the input row and column block address (block 950).

Process 400 then may include "determine input image-wide pixel location" 420, and this can be efficiently determined for 4×4 blocks by using the equation:

$$\text{inputrow}=((\text{row}>>2)<<2)+yy \quad (3)$$

$$\text{inputcol}=((\text{col}>>2)<<2)+xx \quad (4)$$

where yy and xx are the input block pixel coordinates from the descriptor code, and row and col are the input image-wide pixel location coordinates from the output single frame. Shifting the integer coordinates right (>>) and left (<<) sets the base position to a top left corner "00" in an input 4×4 block. Other example implementations may involve divisions and multiplications, and even rounding (i.e. flooring) operations, instead of logical shifts or bitwise operations. Each input pixel location of an entire camera sensor array, such as sensors with Y=1728 rows and X=2352 columns of pixels for example, although many variations exist, may have inputrow and inputcol coordinates from row=0 to Y−1 and col=0 to X−1.

Process 400 then may include "index image-wide input pixel location to image-wide output pixel location" 422, which can be represented in a single frame index as:

img_{zz}(inputrow,inputcol)

The actual output from the mapper unit to the statistics unit may be designated as:

outimg(row,col)=img_{zz}(inputrow,inputcol)
when selecting the single pixel. In two pixel averaging, the output is designated as:

outimg(row,col)=(img_{zz}(inputrow,inputcol)+
img_{zz}(inputrow,inputcol+2))/2

In four pixel averaging, the designations may be as:

outimg(row,col)=(img_{zz}(inputrow,inputcol)+
img_{zz}(inputrow,inputcol+2)+img_{zz}(inputrow+2,inputcol)+img_{zz}(inputrow+2,inputcol+2))/4

The proposed method is applicable to grayscale, color, and mosaic (e.g., Bayer color filter array) sensor data. Handling of the grayscale or simple color images may be more straightforward because in these cases the color channels do not alter as in mosaic-like CFA images and need not be described. For varying number of image captures, the following presents example 2×4 pixel extraction Bayer-like color patterns with indication of which exposure image capture the pixel originates C(zz), where C indicates the color type:

Four exposures: [G(00), R(00), G(11), R(11); B(00), G(01), B(11), G(10)]
Three exposures: [G(00), R(00), G(01), R(10); B(00), G'(01), B(10), G(10)]
Two exposures: [G(00), R(00), G(01), R(01); B(00), G'(00), B(01), G'(01)]

As to the descriptor code for the averaging mode, a pixel extraction mode may be configurable through a dedicated parameter. In one mode, xx coordinates are limited to the first occurrence (i.e., xx<2) in the row of interest in a 4×4 block and the output stream pixels are obtained by averaging pixels corresponding to (yy, xx) and (yy, xx+2). Alternatively, in a four pixel averaging mode, yy and xx coordinates are limited to the first occurrence (i.e., yy<2, xx<2) of some desired color type in a 4×4 block, and the output stream pixels are obtained by averaging pixels corresponding to (yy, xx), (yy, xx+2), (yy+2, xx), and (yy+2, xx+2) all together to obtain a single value for the four pixel locations. The actual extraction mode should be selected depending on the number of exposure images and the output block dimension requirements in order to guarantee that one output stream pixel is produced per pixel location (row, col) in the output block, thus keeping the output stream dimensions constant without the need to duplicate the same pixels between two instances of 2×4 pixel layout. For example, in case of two exposure images, averaging four pixels produces enough data for populating the output 2×4 block, but not 4×4.

Process 400 may include "extract image data of input pixel locations of multiple image captures according to single frame index" 424. This may be performed by looking up the image-wide input pixel locations for an output block on the single frame index, and then retrieving or extracting that image data for the block. The block of image data is saved in a memory whether on-board or off, and whether RAM-type or other memory, and where the image data of each pixel location of an output block either has a stored address for the memory or is in a specific order in the memory. Otherwise, the single frame index may be provided to the statistics unit so that the statistics unit can retrieve the image data for the output block itself.

Process 400 may include "output single frame block by block" 426, and as mentioned, this may be performed by providing block sizes expected by the statistics unit, whether or not it is the same block size as the repeating pattern for constructing the output blocks of the output single frame. Thus, as mentioned, even though the repeating pattern is in 2×4 sub-blocks, the mapper unit may provide the statistics unit blocks of 4×4 pixels, or otherwise, commonly any of pixel blocks of 1×1, 2×2, 2×4, or any other expected size may be provided to the statistics unit and is not limited to the size of the blocks forming the input image captures or repeating patterns as mentioned above.

While this includes providing the statistics unit access to a block of image data already placed in a memory, alternatively this could include simply providing the single frame index for each block so that the statistics unit can retrieve the image data itself.

Process 400 may include the inquiry "all output blocks indexed?" 428, and referring to whether all the blocks of a single frame have all of their output pixel addresses assigned to input pixel locations of the image captures. If no, then the process loops back to operation 408 to analyze the next block of the image captures. If yes, then the process continues with "obtain next set of exposure image captures if any" 430, and the process loops back to operation 402 to start the combining of exposure image captures for the next frame (or next set of exposure image captures). The process ends when there are no more input frames to analyze and the image processing and/or camera parameter setting is complete.

Whether or not there are more frames to process by combining image captures, the process 400 may include "generate statistics using the single frame" 432. The type of statistics that are generated are described above and may be statistics that are used to update camera parameters to capture subsequent images, such as 3A statistics (AEC and/or AF), or used to modify pixel data to improve a displayed image such as with AWB and/or digital video stabilization or dynamic range conversion statistics (using LTM and/or GTM as described above) to name a few examples. Any of the example statistics mentioned above may be used, or any statistic that is generated based on image data formed by using color (or grayscale or luma) filter arrays may be generated.

Process 400 may include "use statistics in 3A algorithms to adjust image data" 434, and this may include using the WB gains for processing of the image data such as with LSC mentioned above, and any other adjustments or refinements made to the image data and at least partly based on the generated statistics.

Process 400 may include "use statistics to provide 3A camera parameter settings" 436, and here where AF parameters and/or AEC parameters are transmitted to a camera module or control to adjust the focus and exposure level for a next image capture.

Process 400 may include "continue pre-processing" 438, and this may include CFA (Color Filter Array) interpolation (Bayer demosaicing), color space conversion, (such as raw RGB to sRGB where not performed already, for example), gamma correction, RGB to YUV conversion, image sharpening, and so on. The pre-processing may be performed by a processor such as the ISP circuit 332 or other processor mentioned herein, for performing these processes by software and/or the ISP's hardware pipelines.

Process 400 then may include "use modified image data" 440, and for rendering whether for final or preview display of the frame or image, storage for later use for example, and/or encoding, or any combination of these. The processed image then may be displayed whether as a view-finder or preview on a digital camera or phone screen, or a final display on another device, or may be stored for later viewing, and may be video or a still image. Alternatively, or additionally, the image data may be provided to an encoder for compression and transmission to another display or storage device.

As another alternative, the proposed method is applicable to a single image comprised of multi-exposure data (i.e., spatially-varying exposure-based (SVE) sensors). Thus, virtual exposure image captures could be created by using SVE sensor arrays that expose pixel locations to different exposure levels within a single exposure. In this case, the pixel locations may be grouped by similar exposure level to form a single virtual exposure image capture thereby providing multiple image captures each with a different exposure level. Since the SVE pattern in each sensor is known, configuring the descriptor to select the pixel of certain exposure levels and color channels in order to produce the output block of pixels for 3A or other algorithms is rather straightforward and therefore not elaborated in greater detail herein.

In addition, any one or more of the operations of the processes in FIGS. 3 and 4 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
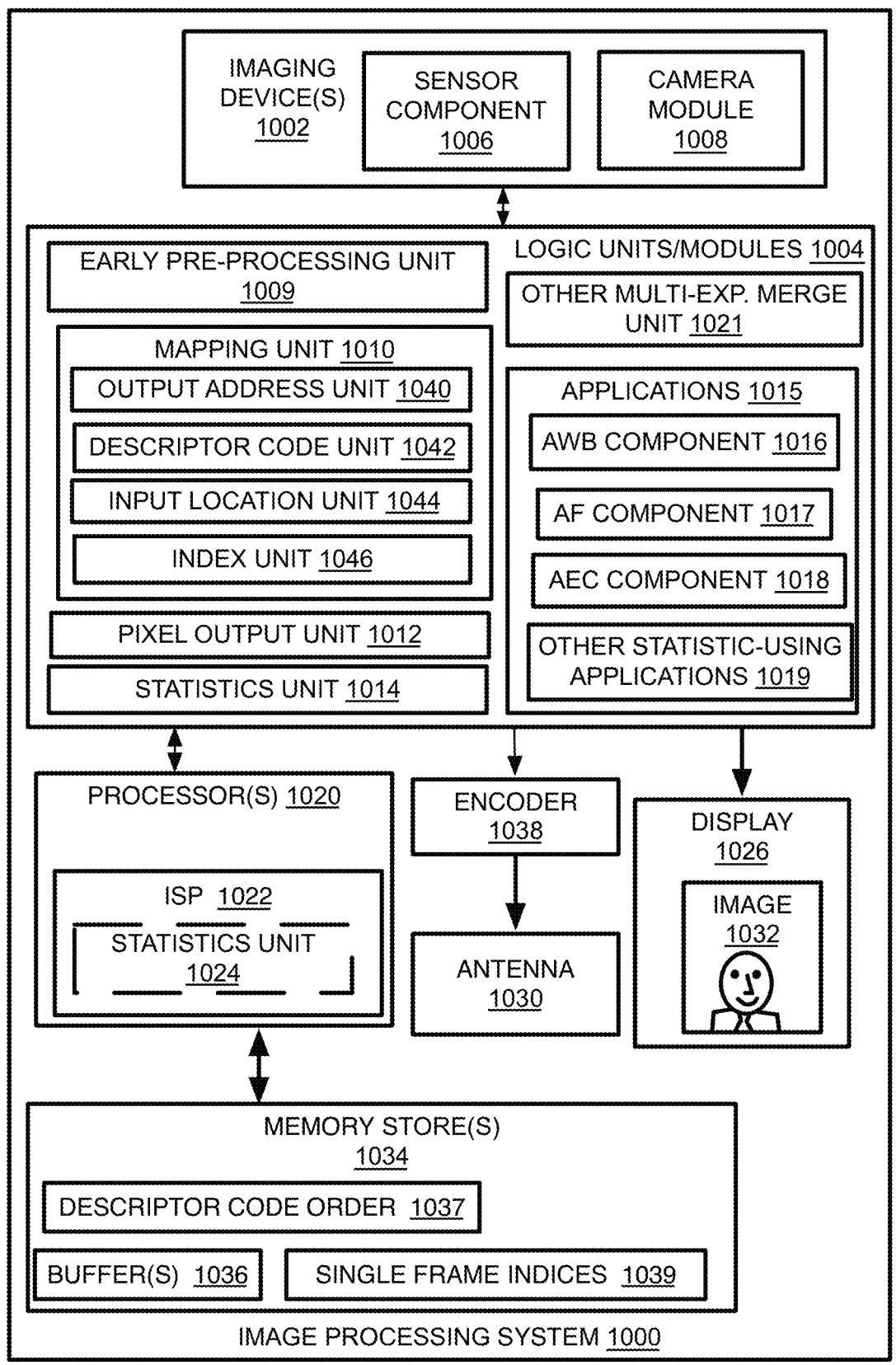
FIG. 10 is an illustrative diagram of an example image processing system

Referring to FIG. 10, an example image processing system 1000 is arranged in accordance with at least some implementations of the present disclosure. In various implementations, the example image processing system 1000 may have an imaging device 1002 to form or receive captured image data. This can be implemented in various ways. Thus, in one form, the image processing system 1000 may be a digital camera or other image capture device, and imaging device 1002, in this case, may be the camera hardware and camera sensor software, module, or component 1008. In other examples, imaging processing system 1000 may have an imaging device 1002 that includes or may be a camera, and logic modules 1004 may communicate remotely with, or otherwise may be communicatively coupled to, the imaging device 1002 for further processing of the image data.

In either case, such technology may include a camera such as a digital camera system, a dedicated camera device, or an imaging phone, whether a still picture or video camera or some combination of both. Thus, in one form, imaging device 1002 may include camera hardware and optics including one or more sensors as well as auto-focus, zoom, aperture, ND-filter, auto-exposure, flash, and actuator controls. These controls may be part of a sensor module or component 1006 for operating the sensor. The sensor component 1006 may be part of the imaging device 1002, or may be part of the logical modules 1004 or both. Such sensor component can be used to generate images for a viewfinder and take still pictures or video. The imaging device 1002 also may have a lens, an image sensor with a RGB Bayer color filter or other types of filters as mentioned herein, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor also may support other types of electronic shutters, such as global shutter in addition to, or instead of, rolling shutter, and many other shutter types as long as a multi-frame statistics gathering window can be used. In some examples, imaging device 1002 may be provided with an eye tracking camera.

In the illustrated example, the logic modules 1004 may include an early pre-processing unit 1009, a mapping unit 1010, another multi-exposure merge unit 1021, a statistics unit 1014, and an applications unit 1015 with the indicated algorithms for using the statistics. The mapping unit 1010, as with a colorID mapping unit described above, may have an output address unit 1040, a descriptor code unit 1042, an input location unit 1044, and an index unit 1046. A pixel output unit 1012 also is provided. The applications unit 1015 may use the statistics such as an automatic white balancing control or component 1016, an automatic focus (AF) component 1017, and an automatic exposure control (AEC) module or component 1018. The statistics unit 1014 (as unit 1024) and/or the applications 1015 may be provided as part of the logic modules and/or on board a processor 1020 such as an ISP 1022. This may include the instructions for operating the units, the statistical data that is being analyzed by the units, and which may be held in registers as described above, or both. The logic modules 1004 may be communicatively coupled to the imaging device 1002 in order to receive the raw image data and embedded data described herein. Otherwise, a memory store(s) 1034 may be provided to store the statistics data in a buffer 1036, the descriptor code order 1037, and the single frame indices 1039 where the memory is formed of RAM such as DRAM.

The image processing system 1000 may have one or more of the processors 1020 which may include the dedicated image signal processor (ISP) 1022 such as the Intel Atom, memory stores 1024, one or more displays 1026, encoder 1038, and antenna 1030. In one example implementation, the image processing system 1000 may have the display 1026, at least one processor 1020 communicatively coupled to the display, at least one memory 1024 communicatively coupled to the processor and having the buffer 1036 or other memories by one example for storing 3A and other statistics data, descriptor code order, and/or single frame indices. The encoder 1038 and antenna 1030 may be provided to compress the modified image date for transmission to other devices that may display or store the image. It will be understood that the image processing system 1000 may also include a decoder (or encoder 1038 may include a decoder) to receive and decode image data for processing by the system 1000. Otherwise, the processed image 1032 may be displayed on display 1026 or stored in memory 1034. As illustrated, any of these components may be capable of communication with one another and/or communication with portions of logic modules 1004 and/or imaging device 1002. Thus, processors 1020 may be communicatively coupled to both the image device 1002 and the logic modules 1004 for operating those components. By one approach, although image processing system 1000, as shown in FIG. 10, may include one particular set of blocks or actions associated with particular components or modules, these blocks or actions may be associated with different components or modules than the particular component or module illustrated here.

Figure 11:
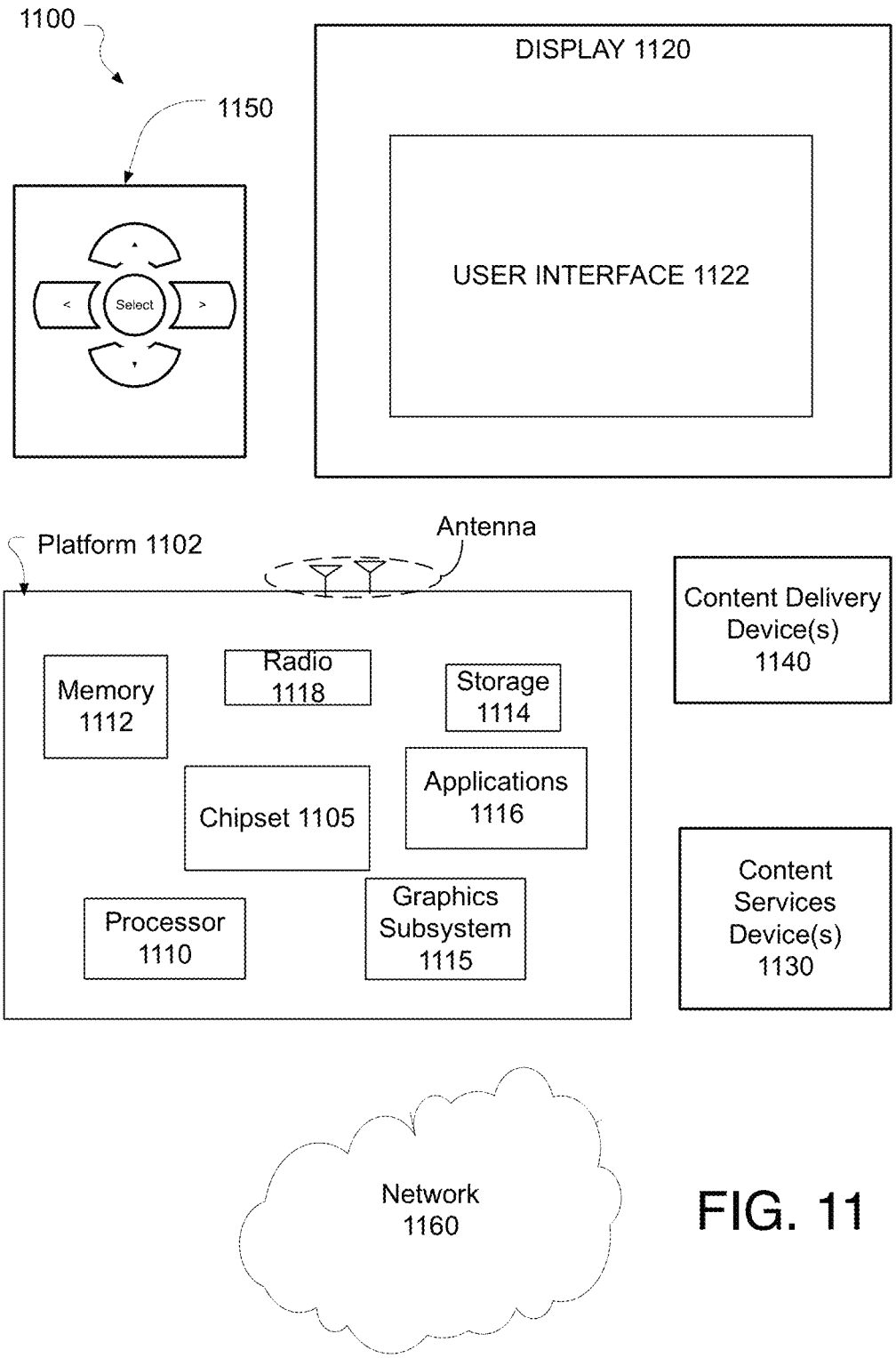
FIG. 11 is an illustrative diagram of an example system.

Referring to FIG. 11, an example system 1100 in accordance with the present disclosure operates one or more aspects of the image processing system described herein. It will be understood from the nature of the system components described below that such components may be associated with, or used to operate, certain part or parts of the image processing system described above. In various implementations, system 1100 may be a media system although system 1100 is not limited to this context. For example, system 1100 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
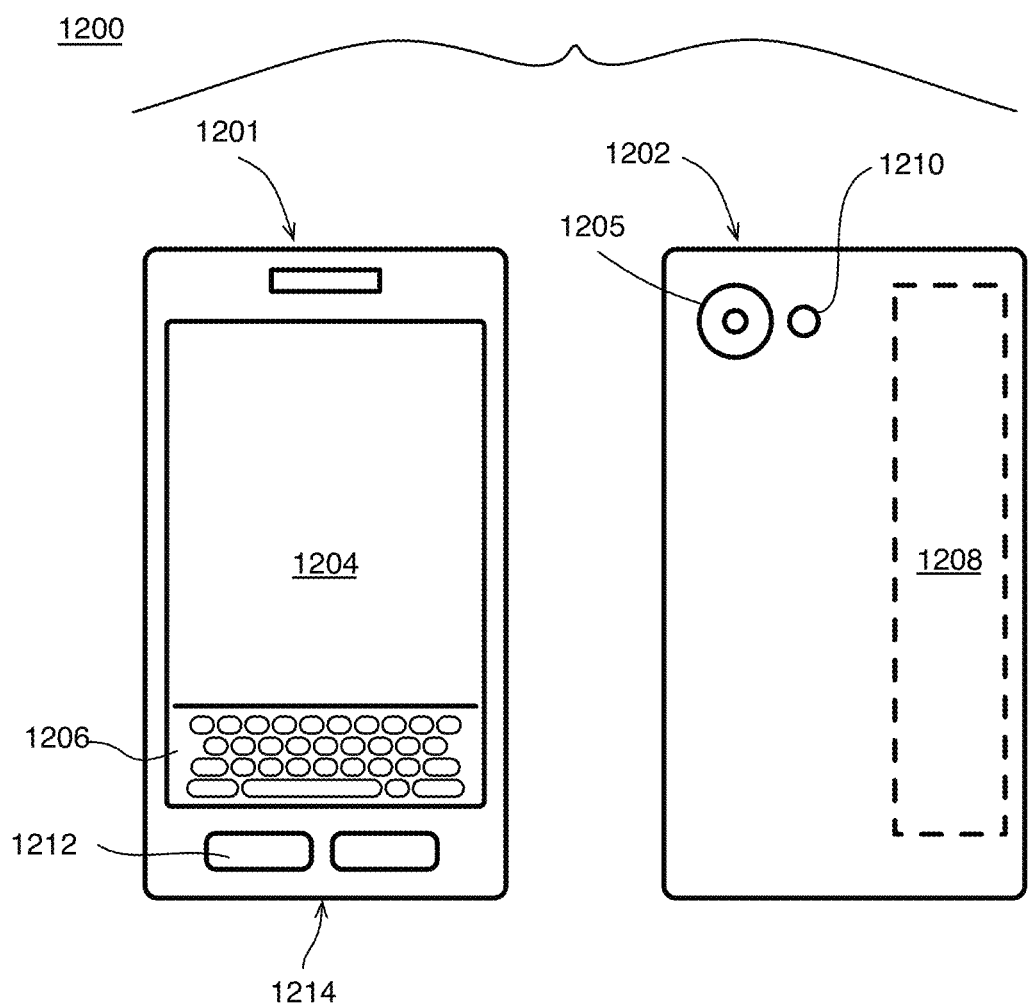
FIG. 12 is an illustrative diagram of an example system, all arranged in accordance with at least some implementations of the present disclosure.

Referring to FIG. 12, a small form factor device 1200 is one example of the varying physical styles or form factors in which systems 1000 or 1100 may be embodied. By this approach, device 1200 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone 1214, or may be digitized by a voice recognition device. As shown, device 1200 may include a camera 1205 (e.g., including at least one lens, aperture, and imaging sensor) and a flash 1210 integrated into back 1202 (or elsewhere) of device 1200. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of light source estimation for image processing, comprises receiving image data of multiple image captures each resulting from a different exposure; generating a single frame of image data to be input to generate statistics of the single frame, the generating comprising selecting image data of different pixel locations of the multiple image captures to form image data of pixel locations on the single frame depending on the exposure level of the image capture and depending on at least one of: an assigned color of a pixel location of one of the image captures and assigned from a color filter array pattern, and a position of a pixel location on one of the image captures; generating the statistics of the single frame; and modifying camera capture parameters by using the statistics to capture a subsequent frame or modifying image data of a frame by using the statistics.

By another implementation, the method may comprise either wherein the multiple image captures are of the same captured frame, or wherein each image capture of the multiple image captures is of a separate input frame; wherein the image data of a pixel location on one of the multiple image captures is selected to form the image data of one pixel location of the single frame; wherein pixel locations of the image captures are selected without considering the image data values of the pixel location to make the selection; wherein one or more pixel locations are selected to be included in the single frame depending on whether the pixel location is on a maximum or minimum exposure image capture versus an intermediate exposure image capture, wherein either only pixel locations of predefined colors are selected from at least one intermediate image capture which is less than all available colors of the at least one intermediate image capture, wherein pixel locations of two colors are selected from the intermediate image capture when three of the image captures are used, and wherein pixel locations of one color are selected from two intermediate image captures are being used, and when a three color filter array is used with pixel camera sensors used to obtain the image data; wherein blocks of input pixel image data from the image captures are not the same size as output blocks receiving the image data on the single frame. The method comprising determining input pixel locations of the image captures to be placed at output pixel locations of the single frame comprising determining a descriptor code pre-assigned to pixel location addresses within an output block of the single frame and that indicates which image capture and which position in an input block to use as the input pixel location for one of the pixel location addresses, wherein the descriptor codes are pre-assigned to the pixel location addresses depending on available color pixel locations from a color filter array pattern used to capture the image data.

By yet another implementation, a computer-implemented system of image processing has at least one image capture device to generate multiple image captures each resulting from a different exposure; memory communicatively coupled to at least one processor and storing image data of the multiple image captures; and at least one processor communicatively coupled to the at least one image capture device and memory, and the at least one processor to operate by: generating a single frame of image data to be input to generate statistics of the single frame, the generating comprising selecting image data of different pixel locations of the multiple image captures to form image data of pixel locations on the single frame depending on the exposure level of the image capture and depending on at least one of: an assigned color of a pixel location of one of the image captures and assigned from a color filter array pattern, and a position of a pixel location on one of the image captures; generating the statistics of the single frame; and modifying camera capture parameters by using the statistics to capture a subsequent frame or modifying image data of a frame by using the statistics.

By another example, the system includes having the at least one processor operate by adding a digital signal processor (DSP) operating a mapper to generate the single frame and added upstream to relatively and generally downstream existing image signal processing hardware that generates statistics; providing blocks of the single frame block by block to statistics generation hardware wherein the single frame blocks are not the same size as blocks received from the image captures block by block, wherein blocks of the image captures received to form a single frame overlap so that individual pixel locations at least initially may be placed in multiple output blocks of the single frame; and wherein the single frame is either (a) expanded relative to the size of the image captures or (b) formed by combining image data of pixel locations of the multiple blocks of the same pixel location on the multiple blocks, wherein the at least one processor rearranges pixel image data of a pixel location of one of the image captures according to a descriptor code and rearranged to a location on an output block of the single frame, wherein the descriptor code indicates an exposure level of one of the image captures where the pixel image data was obtained as well as input block coordinates indicating where on an input block the pixel image data should be obtained; wherein the at least one processor operates by selecting a descriptor code comprising inputting image-wide output pixel coordinates of the single frame to an index formula that outputs a pixel location address within an output block, and wherein descriptor codes are individually assigned to the pixel location addresses; wherein the formula is adaptable to support varying sizes of output blocks of the single frame.

By one approach, at least one non-transitory article having a computer readable medium comprises a plurality of instructions that in response to being executed on a computing device, cause the computing device to operate by: receiving image data of multiple image captures each resulting from a different exposure; generating a single frame of image data to be input to generate statistics of the single frame, the generating comprising selecting image data of different pixel locations of the multiple image captures to form image data of pixel locations on the single frame depending on the exposure level of the image capture and depending on at least one of: an assigned color of a pixel location of one of the image captures and assigned from a color filter array pattern, and a position of a pixel location on one of the image captures; generating the statistics of the single frame; and modifying camera capture parameters by using the statistics to capture a subsequent frame or modifying image data of a frame by using the statistics.

By another approach, the instructions cause the computing device to include wherein the image data is selected without considering the values of the image data; wherein the instructions cause the computing device to determine a descriptor code assigned to an output pixel location address within an output block; and use the descriptor to determine an input image-wide pixel location corresponding to an image-wide output pixel location of the same frame used to determine the output pixel location address; wherein the instructions cause the computing device to operate by combining, or selecting among, image values of two or more pixel locations of the same color of at least one of the image captures to form a single pixel location on an output block of the single frame; wherein the combining, or selecting among, image values comprises at least one of: averaging the image values, selecting a minimum or maximum image value, and using a median value among the image values; and wherein the image data is selected output block by output block of the single frame, and wherein an output block window used to select corresponding input pixel locations of the image captures are overlapped.

In a further example, at least one non-transitory machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing, comprising:
receiving, by at least one processor, image data of multiple image captures each resulting from a different exposure;

generating, by at least one processor, a single frame of image data to be input to generate statistics of the single frame, the generating comprising selecting image data of different pixel locations of the multiple image captures to form image data of pixel locations on the single frame depending on the exposure level of the image capture and depending on both
an assigned color of a pixel location of one of the image captures and assigned from a color filter array pattern and regardless of the image data value of the pixel location, and
a position of a pixel location on one of the image captures;
generating, by at least one processor, the statistics of the single frame; and
modifying, by at least one processor, camera capture parameters by using the statistics to capture a subsequent frame or modifying image data of a frame by using the statistics.

2. The method of claim 1 wherein the multiple image captures are of the same captured frame.

3. The method of claim 1 wherein each image capture of the multiple image captures is of a separate input frame.

4. The method of claim 1 wherein the image data of a pixel location on one of the multiple image captures is selected to form the image data of one pixel location of the single frame.

5. The method of claim 1 wherein one or more pixel locations are selected to be included in the single frame depending on whether the pixel location is on a maximum or minimum exposure image capture versus an intermediate exposure image capture.

6. The method of claim 5 wherein only pixel locations of predefined colors are selected from at least one image capture.

7. The method of claim 5 wherein pixel locations of two colors are selected from the intermediate image capture when three of the image captures are used, and wherein pixel locations of one color are selected from two intermediate image captures when four of the image captures are being used, and when a three color filter array is used with pixel camera sensors used to obtain the image data of either the three or four image captures.

8. The method of claim 1 wherein blocks of input pixel image data from the image captures are not the same size as output blocks receiving the image data on the single frame.

9. The method of claim 1 comprising determining input pixel locations of the image captures to be placed at output pixel locations of the single frame comprising determining a descriptor code pre-assigned to pixel location addresses within an output block of the single frame and that indicates which image capture and which position in an input block to use as the input pixel location for one of the pixel location addresses.

10. The method of claim 9 wherein the descriptor codes are pre-assigned to the pixel location addresses depending on available color pixel locations from a color filter array pattern used to capture the image data.

11. A computer-implemented system of image processing, comprising:
at least one image capture device to generate multiple image captures each resulting from a different exposure;
memory communicatively coupled to at least one processor and storing image data of the multiple image captures; and
at least one processor communicatively coupled to the at least one image capture device and memory, and the at least one processor to operate by:
generating a single frame of image data to be input to generate statistics of the single frame, the generating comprising selecting image data of different pixel locations of the multiple image captures to form image data of pixel locations on the single frame depending on the exposure level of the image capture and depending on both:
an assigned color of a pixel location of one of the image captures and assigned from a color filter array pattern and regardless of the image data value of the pixel location, and
a position of a pixel location on one of the image captures;
generating the statistics of the single frame; and
modifying camera capture parameters by using the statistics to capture a subsequent frame or modifying image data of a frame by using the statistics.

12. The system of claim 11 comprising a digital signal processor (DSP) operating a mapper to generate the single frame and arranged to operate upstream to relatively and generally downstream existing image signal processing hardware that generates statistics.

13. The system of claim 11 comprising providing blocks of the single frame block by block to statistics generation hardware wherein the single frame blocks are not the same size as blocks received from the image captures block by block.

14. The system of claim 11 wherein blocks of the image captures received to form a single frame overlap so that individual pixel locations at least initially may be placed in multiple output blocks of the single frame; and wherein the single frame is either (a) expanded relative to the size of the image captures or (b) formed by combining image data of pixel locations of the multiple blocks of the same pixel location on the multiple blocks.

15. The system of claim 11 wherein the at least one processor rearranges pixel image data of a pixel location of one of the image captures according to a descriptor code and rearranged to a location on an output block of the single frame.

16. The system of claim 15 wherein the descriptor code indicates an exposure level of one of the image captures where the pixel image data was obtained as well as input block coordinates indicating where on an input block the pixel image data should be obtained.

17. The system of claim 15 wherein the at least one processor operates by selecting a descriptor code comprising inputting image-wide output pixel coordinates of the single frame to an index formula that outputs a pixel location address within an output block, and wherein descriptor codes are individually assigned to the pixel location addresses.

18. The system of claim 17 wherein the formula is adaptable to support varying sizes of output blocks of the single frame.

19. At least one non-transitory article having a computer readable medium comprising a plurality of instructions that in response to being executed on a computing device, cause the computing device to operate by:
receiving image data of multiple image captures each resulting from a different exposure;
generating a single frame of image data to be input to generate statistics of the single frame, the generating comprising selecting image data of different pixel locations of the multiple image captures to form image data of pixel locations on the single frame depending on the exposure level of the image capture and depending on both:
- an assigned color of a pixel location of one of the image captures and assigned from a color filter array pattern, wherein the image data is selected without considering the values of the image data, and
- a position of a pixel location on one of the image captures;

generating the statistics of the single frame; and modifying camera capture parameters by using the statistics to capture a subsequent frame or modifying image data of a frame by using the statistics.

20. The article of claim 19 wherein the instructions cause the computing device to determine a descriptor code assigned to an output pixel location address within an output block; and use the descriptor to determine an input image-wide pixel location corresponding to an image-wide output pixel location of the same frame used to determine the output pixel location address.

21. The article of claim 19 wherein the instructions cause the computing device to operate by combining, or selecting among, image values of two or more pixel locations of the same color of at least one of the image captures to form a single pixel location on an output block of the single frame.

22. The article of claim 21 wherein the combining, or selecting among, image values comprises at least one of: averaging the image values, selecting a minimum or maximum image value, and using a median value among the image values.

23. The article of claim 19 wherein the image data is selected output block by output block of the single frame, and wherein an output block window used to select corresponding input pixel locations of the image captures are overlapped.

* * * * *